United States Patent
Louis et al.

(10) Patent No.: US 11,851,541 B2
(45) Date of Patent: Dec. 26, 2023

(54) FIBER REINFORCED THERMOPLASTIC MATRIX COMPOSITE MATERIAL

(71) Applicants: SOLVAY SPECIALTY POLYMERS USA, LLC, Alpharetta, GA (US); CYTEC INDUSTRIES INC., Princeton, NJ (US)

(72) Inventors: Chantal Louis, Alpharetta, GA (US); James Francis Pratte, Wilmington, DE (US)

(73) Assignees: SOLVAY SPECIALTY POLYMERS USA, LLC, Alpharetta, GA (US); Cytec Industries Inc., Princeton, NJ (US)

( * ) Notice: Subject to any disclaimer, the term of this patent is extended or adjusted under 35 U.S.C. 154(b) by 79 days.

(21) Appl. No.: 17/625,367

(22) PCT Filed: Jul. 9, 2020

(86) PCT No.: PCT/EP2020/069322
§ 371 (c)(1),
(2) Date: Jan. 7, 2022

(87) PCT Pub. No.: WO2021/008983
PCT Pub. Date: Jan. 21, 2021

(65) Prior Publication Data
US 2022/0315717 A1 Oct. 6, 2022

Related U.S. Application Data

(60) Provisional application No. 62/873,821, filed on Jul. 12, 2019.

(30) Foreign Application Priority Data

Oct. 24, 2019 (EP) .................................... 19205200

(51) Int. Cl.
*C08J 5/24* (2006.01)
*C08G 8/02* (2006.01)
*C08K 3/04* (2006.01)
*C08K 7/06* (2006.01)

(52) U.S. Cl.
CPC ............... *C08J 5/243* (2021.05); *C08G 8/02* (2013.01); *C08K 3/04* (2013.01); *C08K 7/06* (2013.01); *C08J 2361/16* (2013.01)

(58) Field of Classification Search
None
See application file for complete search history.

(56) References Cited

U.S. PATENT DOCUMENTS

| 8,158,245 B2 * | 4/2012 | Pratte | B29C 70/88 |
| | | | 427/407.1 |
| 2005/0207931 A1 * | 9/2005 | Hesse | B22F 1/065 |
| | | | 419/10 |

FOREIGN PATENT DOCUMENTS

JP  01221426 A  * 9/1989

OTHER PUBLICATIONS

JP011221426A English Machine translation, prepared May 19, 2023. (Year: 2023).*

* cited by examiner

*Primary Examiner* — Christopher M Rodd
(74) *Attorney, Agent, or Firm* — Osha Bergman Watanabe & Burton LLP

(57) ABSTRACT

The present invention generally relates a composite material containing fibers and a resin matrix that comprises a PEEK-PEoEK copolymer having $R_{PEEK}$ and $R_{PEoEK}$ repeat units in a molar ratio $R_{PEEK}/R_{PEoEK}$ ranging from 95/5 to 5/95 in contact with at least a part of the surface of such fibers. The present invention also relates to methods for making such composite materials, shaped articles made from such composite materials, and methods of making such articles.

16 Claims, No Drawings

FIBER REINFORCED THERMOPLASTIC MATRIX COMPOSITE MATERIAL

This application is a U.S. national stage entry under 35 U.S.C. § 371 of international patent application No. PCT/EP2020/069322, filed on Jul. 9, 2020, which claims priority to U.S. provisional patent application No. 62/873,821, filed on Jul. 12, 2019, and to European patent application 19205200.9, filed on Oct. 24, 2019, the whole content of each of these applications being explicitly incorporated herein by reference.

FIELD OF THE INVENTION

The present invention generally relates to a fiber reinforced thermoplastic matrix composite material, more particularly to fiber reinforced thermoplastic composite materials wherein the thermoplastic matrix comprises a poly(aryletherketone) (PAEK) polymer.

BACKGROUND

PAEK polymers are a class of polymer-containing aromatic groups in the polymer back bone bonded together with ether and ketone functional groups. This class of polymers contains polyetheretherketone (PEEK), polyetherketoneketone (PEKK), polyetherketone (PEK), polyetherketoneetherketoneketone (PEKEKK) and many other configurations and copolymers based off these basic chemical formulations. PAEK polymers generally are desirable for demanding applications where good fluid resistance, high temperature performance (mechanical and electrical), and flame resistance is needed. An example of such an application is the use of the polymer in advanced composites for use in airplane structural members. PEEK and PEKK composites such as APC-2/AS4, a carbon fiber reinforced PEEK unidirectional composite tape supplied by Solvay, and APC (PEKK FC)/AS4D, a carbon fiber reinforced PEKK unidirectional composite tape supplied by Solvay, are used extensively for making a variety of airplane parts using rapid fabrication process like stamp forming and continuous compression molding. Their excellent mechanical and environmental performance combined with cost effective fabrication processes has made them relatively industry standards for numerous composite parts such as airplane brackets, clips, stiffeners, and window frames to name a few.

One limitation of using these PEEK and PEKK matrix composites is the high melt processing temperatures (>370° C.) needed to easily shape, form, fuse and consolidate the material. This limitation becomes more acute as the size of the part, particularly on an areal basis, increases substantially. An example of this would be fabricating a composite wing or fuselage skin for a commercial jet liner. These structures today are fabricated with carbon fiber reinforced epoxy composites using either automated tape laying (ATL) or automated fiber placement (AFP) machines to deposit the prepreg unidirectional composite tape onto the tool per the designed lay-up, then bagged and cured in an autoclave or an oven with a process known as vacuum bag only (VBO). The curing temperature of such materials is ~175° C., which is less than half the processing temperature of the PEEK and PEKK composites. The higher the process temperature, the more likely there will be greater temperature variation across the surface of the part and such variation may lead to some areas being overheated and some areas not consolidated. In addition, the higher process temperature of PEEK and PEKK composites limit the deposition speed with AFP and ATL equipment. Adequate deposition speed is needed to achieve economical rates, to be cost competitive with other materials such as carbon fiber epoxies and metal structures. Other innovative part fabrication approaches (such as in-situ consolidation, where the thermoplastic composite is consolidated as it is fused to the previous layer using a specialized ATL or AFP machine) are too slow due to the large temperature delta inputting heat and removing it while under pressure, even though such innovative approaches have the potential to substantially save cost by removing the secondary consolidation step with an oven or autoclave. Thus, it is desirable to have a lower processing temperature PAEK polymer that maintains the structural performance of PEEK and PEKK composites, which would enable more economical processing for larger composite structures.

Recently, Victrex has commercialized a PAEK polymer matrix composite material, AE™250, which includes a similar polymer matrix has been used in Toray's Cetex TC1225 carbon fiber/PAEK prepreg. The PAEK polymer used in these composite materials has a peak melt temperature as measured by Differential Scanning Calorimetry (DSC) of 305° C. compared with 340° C. for PEKK (T:I=70/30) and 342° C. for PEEK. This difference in peak melt temperature results in a lowering of process temperatures by 25 to 55° C. compared to PEEK and PEKK (T:I=70/30) polymer based composites. As reported by Howell, et al ("*Low Melt PAEK (LMPAEK) prepregs for Improved Processing of Thermoplastic Composites*"; Luinge, Howell, and Straetker, SAMPE 2019, Charlotte, N.C., May 19-23, 2019), the TC1225 PAEK was able to be tow/tape placed at speeds of up to 200 mm/s with the resulting consolidated laminates having low porosity in the fully fused structure. The processing temperature for these AFP/ATL processes was 325-350° C., making the resulting process and laminate attractive for consideration for use in large composite structures. Yet, while the processing of the TC1225 composite prepreg is attractive, its shear, un-notch and notch compression strength properties are 10-20% below those of carbon fiber reinforced PEEK and PEKK composites. This change in properties would most likely result in heavier structures, since compression and shear are key properties in designing airplane composite structures. Another option for a lower-melting PAEK is to adjust the terephthaloyl to isophthaloyl (T:I) ratio of PEKK polymer to a lower ratio to obtain a lower melting polymer similar to that of the polymer used in the AE™250 product. While a lower T:I ratio PEKK polymer would have mechanical performance similar to a higher T:I ratio PEKK polymer and PEEK polymer when crystallized at levels beyond 15%, its crystallization rate is much slower thus compromising the fabrication speed for making large structures.

PEEK-PEDEK copolymers, which include PEDEK units of formula: -Ph-Ph-O-Ph-C(O)-Ph- and greater than 65% PEEK units of formula -Ph'-O-Ph'-C(O)-Ph'-O—, with each of -Ph- and -Ph'- being a 1,4-phenylene group, have been known to exhibit a lower melting point, but their mechanical properties are not as good as PEEK. See, for example, U.S. Pat. No. 4,904,532 to ICI, which describes composite laminates that include such PEEK-PEDEK copolymers.

It is noted that poly(aryl ether ketone) polymers comprising PEEK units and PEoEK units of formula —O-orthoPh-O-Ph-C(O)-Ph- (with -orthoPh- being a 1,2-phenylene unit; and -Ph-being a 1,4-phenylene unit) have already been described in the art. For instance, JP1221426 describes copolymers of PEEK and PEoEK in examples 5 and 6, manufactured from hydroquinone, catechol and difluorobenzophenone, as allegedly possessing increased glass transition temperature, and simultaneously excellent heat resistance. Similarly, A. Ben-Haida et al. in Macromolecules, 2006, 39, 6467-6472 describe 50/50 and 70/30 copolymers of PEEK and PEoEK manufactured by step-growth polycondensation of hydroquinone and catechol with 4,4'-difluorobenzophenone in diphenyl sulfone. The Applicant in re-working the teachings of this scientific paper has shown that the copolymers manufactured as taught therein possess, among the others, lower thermal resistance, having peak degradation temperatures of lower than 550° C., and low melt stability.

DETAILED DESCRIPTION

It has been now found that composite materials comprising fibers and a polymer matrix that comprises PEEK-PEoEK copolymers with a PEEK/PEoEK units ratio in the range from 95/5 to 5/95, preferably from 95/5 to 65/35; are processable at lower temperature than analogous fiber-reinforced PEEK composite materials, have a crystallization rate sufficient to allow rapid fabrication processes with short cycle times; and exhibit composite mechanical performance similar to those of analogous fiber-reinforced PEEK composite materials.

PEEK-PEoEK Copolymer

As used herein, a "PEEK-PEoEK copolymer" comprises at least 50 mol. %, collectively, of repeat units ($R_{PEEK}$) and repeat units ($R_{PEoEK}$), relative to the total number of moles of repeat units in the PEEK-PEoEK copolymer. In some embodiments, the PEEK-PEoEK copolymer comprises at least 60 mol. %, at least 70 mol. %, at least 80 mol. %, at least 90 mol. %, at least 95 mol. %, and most preferably at least 99 mol. % of repeat units ($R_{PEEK}$) and ($R_{PEoEK}$), relative to the total number of moles of repeat units in the PEEK-PEoEK copolymer.

Repeat unit ($R_{PEEK}$) is represented by formula:

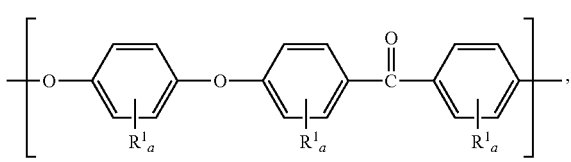

(A)

repeat unit ($R_{PEoEK}$) is represented by formula:

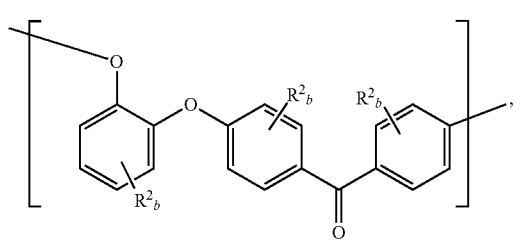

(B)

where each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, each a and b is independently selected from the group consisting of integers ranging from 0 to 4; and the PEEK-PEoEK copolymer comprises the repeat units ($R_{PEEK}$) and ($R_{PEoEK}$) in a molar ratio $R_{PEEK}/R_{PEoEK}$ ranging from 95/5 to 5/95.

In some preferred embodiments, each a is zero, such that the repeat units ($R_{PEEK}$) are repeat units of formula:

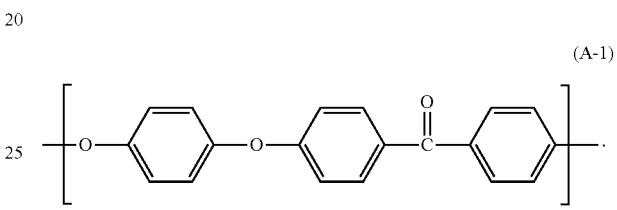

(A-1)

In some preferred embodiments, each b is zero, such that the repeat units ($R_{PEoEK}$) are repeat units of formula:

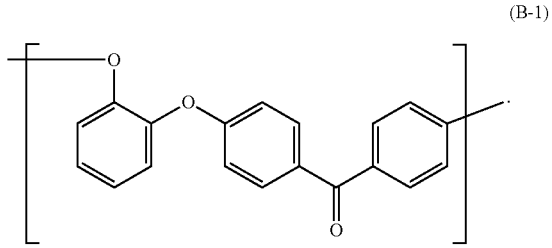

(B-1)

Preferably, repeat units ($R_{PEEK}$) are repeat units of formula (A-1), and repeat units ($R_{PEoEK}$) are repeat units of formula (B-1).

The PEEK-PEoEK copolymer of the present invention may additionally comprise repeat units ($R_{PAEK}$) different from repeat units ($R_{PEEK}$) and ($R_{PEoEK}$), as above detailed. In such case, the amount of repeat units ($R_{PAEK}$) can be comprised between 0.1 and less than 50 mol. %, preferably less than 10 mol. %, more preferably less than 5 mol. %, most preferably less than 2 mol. %, with respect to the total number of moles of repeat units of PEEK-PEoEK copolymer.

When repeat units ($R_{PAEK}$) different from repeat units ($R_{PEEK}$) and ($R_{PEoEK}$) are present in the PEEK-PEoEK copolymer of the present invention, these repeat units ($R_{PAEK}$) different from units ($R_{PEEK}$) and ($R_{PEoEK}$), as described above, generally comply with any of the following formulae (K-A) to (K-M) herein below:

(K-A) 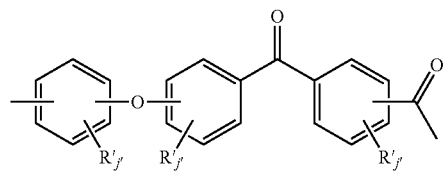
(K-B) 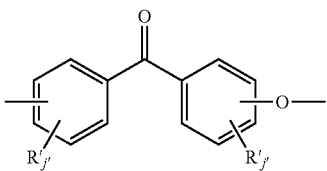
(K-C) 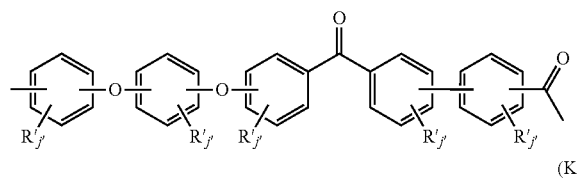
(K-D) 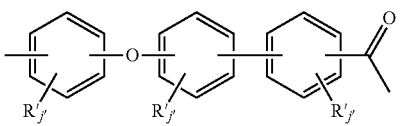
(K-E) 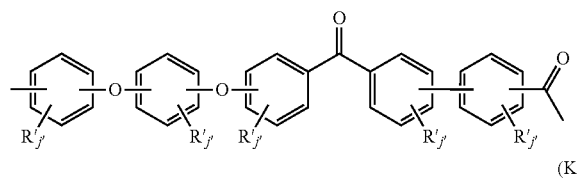
(K-F) 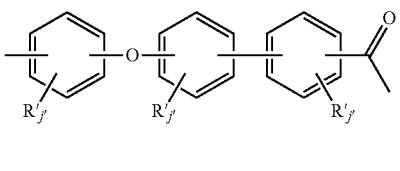
(K-G) 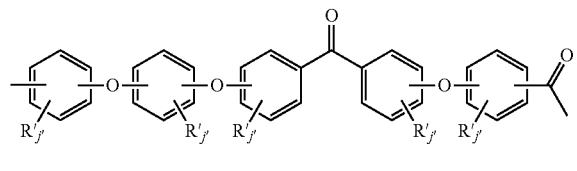
(K-H) 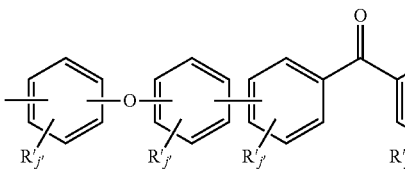
(K-I) 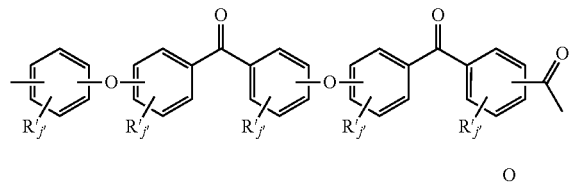
(K-J) 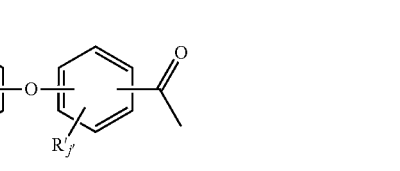
(K-K) 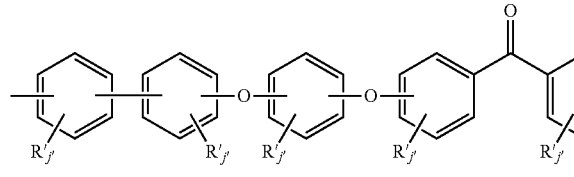
(K-L) 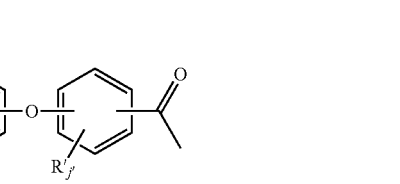
(K-M) 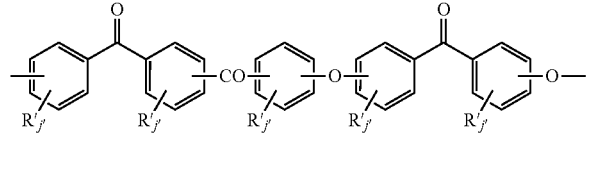
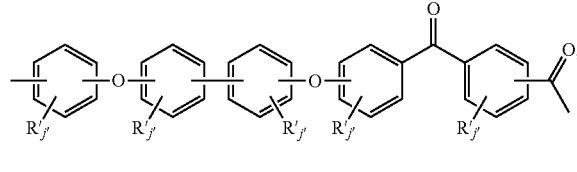

wherein in each of formulae (K-A) to (K-M) above, each of R', equal to or different from each other, is independently at each occurrence selected from a $C_1$-$C_{12}$ alkyl, alkenyl, alkynyl, or aryl group optionally comprising one or more than one heteroatoms; sulfonic acid and sulfonate groups; phosphonic acid and phosphonate groups; amine and quaternary ammonium groups; and each of j', equal to or different from each other, is independently at each occurrence selected from 0 and an integer of 1 to 4, preferably j' being equal to zero. It is generally preferred for the PEEK-PEoEK copolymer of the present invention to be essentially composed of repeat units ($R_{PEEK}$) and ($R_{PEoEK}$), as above detailed. Thus, in some preferred embodiments, the PEEK-PEoEK copolymer consists essentially of repeat units $R_{PEEK}$ and $R_{PEoEK}$. As used herein, the expression "consists essentially of repeat units $R_{PEEK}$ and $R_{PEoEK}$" means that any additional repeat unit different from repeat units $R_{PEEK}$ and $R_{PEoEK}$, as above detailed, may be present in the PEEK-PEoEK copolymer in amount of at most 2 mol. %, at most 1 mol. % or at most 0.5 mol. %, relative to the total number of moles of repeat units in the PEEK-PEoEK copolymer, and so as not to substantially alter the advantageous properties of the PEEK-PEoEK copolymer.

Repeat units $R_{PEEK}$ and $R_{PEoEK}$ are present in the PEEK-PEoEK copolymer in a $R_{PEEK}/R_{PEoEK}$ molar ratio ranging from 95/5 to 5/95. Yet, it is generally understood that preferred PEEK-PEoEK copolymers suitable for the composite materials disclosed herein are those wherein $R_{PEEK}$ units represent the majority, that is to say that the $R_{PEEK}/R_{PEoEK}$ molar ratio preferably ranges from 95/5 to more than 50/50, even more preferably from 95/5 to 60/40, still more preferably from 90/10 to 65/35, most preferably 85/15 to 70/30.

Preferred PEEK-PEoEK copolymers generally possess a solubility of below 0.2% wt in N-methylpyrrolidone (NMP), N,N-dimethylacetamide (DMAc) and N,N-dimethylformamide (DMF), when determined at a temperature of 150° C. or less. In some embodiments, the PEEK-PEoEK copolymer used in connection with composite materials is advantageously substantially insoluble in the above-listed solvents. It is noticeable mentioning that this property is a further prominent feature differentiating the preferred PEEK-PEoEK copolymers of the invention from those described by A. Ben-Haida et al. in the cited reference and in JP1221426, cited above, which make them particularly adapted for use in applications requiring improved chemical and/or, in some cases, fluid resistance.

In some embodiments, the PEEK-PEoEK copolymer has a melting temperature (Tm) of less than or equal to 340° C., preferably less than or equal to 335° C. The melting temperatures described herein are measured as the peak temperature of the melting endotherm on the second heat scan in a differential scanning calorimeter (DSC) according to ASTM D3418-03 and E794-06, and using heating and cooling rates of 10° C./min.

In some embodiments, the PEEK-PEoEK copolymer has a heat of fusion (ΔH) of at least 5 J/g, preferably at least 10 J/g, or at least 15 J/g. The heats of fusion described herein are determined as the area under the melting endotherm on the second heat scan in a differential scanning calorimeter (DSC) according to ASTM D3418-03 and E793-06, with heating and cooling rates of 20° C./min. In some aspects, the PEEK-PEoEK copolymer may have a heat of fusion (ΔH) of at most 75 J/g, preferably at most 65 J/g.

Depending upon the requirements, the PEEK-PEoEK copolymer may be manufactured with higher or lower molecular weight, so as to tune molten viscosity in a very wide range. In some embodiments, the PEEK-PEoEK copolymer may have a melt viscosity (MV) as measured according to ASTM D3835 at 380° C., 46.3 s of at least 0.10 kN/m², more preferably at least 0.20 kN/m² and most preferably at least 0.25 kN/m². In some embodiments, the PEEK-PEoEK copolymer may have a melt viscosity (MV) as measured according to ASTM D3835 at 380° C., 46.3 s of at most 0.60 kN/m², more preferably at least 0.55 kN/m² and most preferably at least 0.50 kN/m².

The stability in the melt phase of the PEEK-PEoEK copolymer is improved when compared over the melt stability of PEEK-PEoEK copolymers of the prior art. In particular, melt stability, when determined as a ratio between the melt viscosity determined after 40 minutes of dwell time at 4100 under a shear rate of 46.3 s-1 and the melt viscosity determined after 10 minutes of dwell time at same temperature and shear rate, wherein said melt viscosity is determined using a capillary rheometer according to ASTM D3835 standard using a conical die (diameter=1.016 mm, length=20.32 mm, cone angle=120°), is preferably of less than 1.23, preferably less than 1.22, more preferably less than 1.21. Preferably the melt stability is higher than 0.60, more preferably higher than 0.65, most preferably higher than 0.70. In some embodiments, the PEEK-PEoEK copolymer has a glass transition temperature (Tg) of less than or equal to 165° C., preferably less than or equal to 160° C., less than or equal to 155° C., or less than or equal to 150° C. as measured in a differential scanning calorimeter (DSC) according to ASTM D3418-03 and E1356-03. In some embodiments, the PEEK-PEoEK copolymer has a glass transition temperature (Tg) of higher than or equal to 135° C., preferably higher or equal to 137° C., higher than or equal to 140° C. as measured in a differential scanning calorimeter (DSC) according to ASTM D3418-03 and E1356-03.

FT-IR analysis of the PEEK-PEoEK copolymer can provide valuable information about microstructure of the copolymer, including the concatenation of the various monomers, characteristics of the end groups and the presence or absence of defects. According to certain preferred embodiments, the PEEK-PEoEK copolymer possesses a microstructure such that its FT-IR spectrum, when recorded between 600 and 1,000 $cm^{-1}$ in ATR mode on polymer powder, is such that the following inequalities are satisfied:

(i)

$$\frac{A_{700\,cm^{-1}}}{A_{704\,cm^{-1}}} \le 0.99,$$

wherein $A_{700\,cm^{-1}}$ is the absorbance at 700 $cm^{-1}$ and $A_{704\,cm^{-1}}$ is the absorbance at 704 $cm^{-1}$;

(ii)

$$\frac{A_{816\,cm^{-1}}}{A_{835\,cm^{-1}}} \ge 0.61,$$

wherein $A_{816\,cm^{-1}}$ is the of absorbance at 816 $cm^{-1}$ and $A_{835\,cm^{-1}}$ is the absorbance at 835 $cm^{-1}$;

(iii)

$$\frac{A_{623\,cm^{-1}}}{A_{557\,cm^{-1}}} \le 1.60,$$

wherein $A_{623\ cm^{-1}}$ is the of absorbance at 623 cm⁻¹ and $A_{557\ cm^{-1}}$ is the absorbance at 557 cm⁻¹;
(iv)

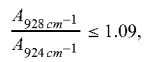

wherein $A_{928\ cm^{-1}}$ is the of absorbance at 928 cm⁻¹ and $A_{924\ cm^{-1}}$ is the absorbance at 924 cm⁻¹.

Preferred PEEK-PEoEK copolymers possessing the specific microstructure (including monomers' concatenation, end groups and defects), which is characterized by the spectroscopic features above, is particularly preferred for use in composites of the present invention, as delivering improved chemical and mechanical performance.

The PEEK-PEoEK copolymer may be such that it has a calcium content of less than 5 ppm, as measured by Inductively Coupled Plasma Optical Emission Spectrometry (ICP-OES) calibrated with standards of known calcium content. Such a particularly low and controlled Ca content is particularly beneficial when the PEEK-PEoEK copolymer is to be used in materials that require certain dielectric performance. According to these preferred embodiments, the PEEK-PEoEK copolymer may have a calcium content of less than 4 ppm, less than 3 ppm or even more preferably less than 2.5 ppm.

In these preferred embodiments, the PEEK-PEoEK copolymer may also be such that it has a sodium content of less than 1,000 ppm, as measured by Inductively Coupled Plasma Optical Emission Spectrometry (ICP-OES) calibrated with standards of known sodium content.

Preferably, the PEEK-PEoEK copolymer may have a sodium content of less than 900 ppm, less than 800 ppm or even more preferably less than 500 ppm.

In some embodiments, the PEEK-PEoEK copolymer may be such that it has a phosphorus content of at least 6 ppm, as measured by Inductively Coupled Plasma Optical Emission Spectrometry (ICP-OES) calibrated with standards of known phosphorus content. Preferably, the PEEK-PEoEK copolymer has a phosphorous content of at least 10 ppm, at least 15 ppm or even more preferably at least 20 ppm.

In the composite material of the present invention, it may be advantageous to select PEEK-PEoEK copolymers having increased thermal stability, which may be particularly beneficial in fabrication of composite materials. Accordingly, in some embodiments, PEEK-PEoEK copolymers have a peak degradation temperature of at least 550° C., as measured TGA according to ASTM D3850, more preferably at least 551° C. and even more preferably at least 552° C.

Methods of Making PEEK-PEoEK Copolymer

Methods adapted for making PEEK-PEoEK copolymers are generally known in the art.

Generally, the PEEK-PEoEK copolymer used herein is made by a method which comprises reacting at least one difluoro-compound of formula (C):

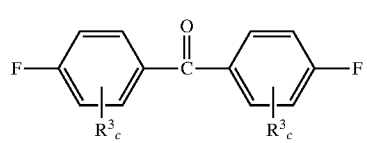
(C)

with a mixture of di-hydroxy compounds of formulas (D) and (E):

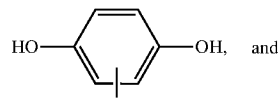
(D)

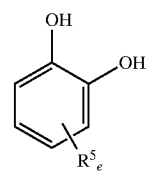
(E)

in a molar ratio (D)/(E) ranging from 95/5 to 5/95, wherein $R^3$, $R^4$, and $R^5$, have the meaning specified above, each c, d, and e is independently selected from the group consisting of integers ranging from 0 to 4, in a polar organic solvent in the presence of a base, such as, for example, $Na_2CO_3$, $K_2CO_3$, or a combination thereof. Preferably each of c, d, and e is zero. In said method, a step of terminating the (poly) condensation reaction by reaction with a suitable agent may be included. Agents which may be used for terminating the polycondensation reaction include compounds which terminate chain growth by being incorporated in the polymer backbone via a condensation reaction (also referred to as end-capping agents) and compounds which terminate chain growth without being incorporated in the polymer backbone through a condensation reaction (also referred to as terminating agents).

End-capping agents used in the method of making the PEEK-PEoEK copolymer notably include those represented by formula (F) below

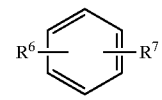

wherein
$R^6$ is F, Cl, or OH,
$R^7$ is —C(O)—Ar—$R^{10}$, —O—Ar—$R^{10}$, —SO$_2$—Ar—$R^{10}$, —Ar—$R^{10}$, an alkyl (e.g. a $C_1$-$C_{10}$ alkyl or a $C_1$-$C_5$ alkyl) or —H, with Ar being an arylene group comprising at least one benzene ring (i.e. one benzene ring or several benzene rings), and with $R^{10}$ being F, Cl or H.
Preferably, $R^7$ is —C(O)—Ar—$R^{10}$, Ar—$R^{10}$ or H, with $R^{10}$ being F, Cl or H. According to certain preferred embodiments, $R^{10}$ is F.
Preferably, $R^6$ is F or OH. More preferably, $R^6$ is F.
When $R^7$ is different from —H, $R^6$ and $R^7$ may be 1,2- or ortho-substituted on the phenylene cycle of formula (F) or they may be 1,3- or meta-substituted on the phenylene cycle.
Alternatively, $R^6$ and $R^7$ may preferably be 1,4- or para-substituted on the phenylene cycle of formula (F).
In some embodiments, the end-capping agent is selected from the group consisting of 4,4'-difluorobenzophenone, phenol, 4-phenoxyphenol, 4-phenylphenol, 4-fluorobenzophenone, 3-fluorobenzophenone, 2-fluorobenzophenone, 4,4'-dichlorodiphenylsulfone, 4,4'difluorodiphenylsulfone and a mixture thereof. Difluoro-compounds and monofunctional phenols are preferably used as end-capping agents.

In some embodiments, the end-capping agent is an excess of a difluoro-compound monomer. The end-capping agent used in the method of the present invention is preferably 4,4'-difluorobenzophenone, phenol, 4-phenoxyphenol, 4-phenylphenol or a mixture thereof. Lithium chloride is one example of a terminating agent, which will terminate the reaction without being incorporated in the polymer backbone through condensation. Other terminating agents are known in the art, such as magnesium chloride and calcium chloride.

In some embodiments, the reaction is terminated with at least one end-capping agent and with at least one terminating agent other than an end-capping agent. Preferably, 4,4'-difluorobenzophenone and lithium chloride are respectively used as end-capping agent and terminating agent in the method of the present invention.

In general, the (poly)condensation reaction is carried out with a slight excess of difluoro-compound of formula (C); it is further understood that, when used, the end-capping agent may be added to the reaction mixture at the inception of the polycondensation; as a whole, hence, the molar ratio $[(C)+(F)]/[(D)+(E)]$ is $\geq 1.000$, preferably $\geq 1.003$, more preferably $\geq 1.006$, even more preferably $>1.010$.

Preferably, the compound of formula (C) is 4,4'-difluorobenzophenone (DFBP). Preferably, the compound of formula (D) is hydroquinone. Preferably, the compound of formula (E) is catechol (which may be also referred to as pyrocatechol or 1,2-dihydroxybenzene). In some embodiments, the compound of formula (C) is 4,4'-difluorobenzophenone (DFBP), the compound of formula (D) is hydroquinone, and the compound of formula (E) is catechol.

The PEEK-PEoEK copolymer of the invention may be made in a solvent comprising diphenysulfone. In some embodiments, the solvent comprises at least 50 wt. % of diphenylsulfone, based on the total weight of solvent in the reaction mixture, for example at least 60 wt. %, at least 70 wt. %, at least 80 wt. %, at least 90 wt. %, at least 95 wt. % or at least 98 wt. %, based on the total weight of solvent in the reaction mixture. In some embodiments, the solvent consists essentially in diphenylsulfone. In the method of the present invention, a solvent comprising limited amounts of impurities, as detailed in U.S. Pat. No. 9,133,111 is generally used.

The PEEK-PEoEK copolymer of the invention may be made by a method using a base, for example selected from the group consisting of potassium carbonate ($K_2CO_3$), potassium bicarbonate, sodium carbonate ($Na_2CO_3$), cesium carbonate ($Cs_2CO_3$), potassium phosphate and sodium bicarbonate. The base acts to deprotonate components (D) and (E) during the condensation reaction. The condensation is preferably carried out in the presence potassium carbonate ($K_2CO_3$), sodium carbonate ($Na_2CO_3$) or a mixture of both, most preferably a mixture of both.

In the method of making the PEEK-PEoEK copolymer, the reaction mixture is generally polycondensed, within the temperature range, until the requisite degree of condensation is reached. The polycondensation time can be from 0.1 to 10 hours, preferably from 0.2 to 4 or from 0.5 to 3 hours, depending on the nature of the starting monomers and on the selected reaction conditions.

The solvent and the inorganic constituents, for example sodium fluoride or potassium fluoride or excess of base, can be removed by suitable methods such as dissolving and filtering, screening or extracting. This is preferably achieved through steps (a) to (d) and (e) to (g) or (e') to (g'), as below detailed, this particular sequence of steps being useful for achieving the particularly preferred microstructure/end group chemistry and purity, as particularly beneficial for certain fields of use.

According to preferred embodiments, the PEEK-PEoEK copolymer is advantageously recovered by successively:
(a) isolating a solid phase comprising PEEK-PEoEK copolymer from the product mixture, by cooling the same at a temperature of below 120° C.;
(b) contacting the said solid phase comprising the PEEK-PEoEK copolymer with a solvent having a normal boiling point of less than 100° C. at a temperature between 15 to 100° C. and separating the residual solid from said solvent;
(c) optionally, contacting the said solid phase comprising the PEEK-PEoEK copolymer with demineralized water at a temperature between 15 to 100° C., preferably between 15 to 40° C., and separating the residual solid (1) from said demineralized water;
(d) contacting the said residual solid (1) comprising the PEEK-PEoEK copolymer with an aqueous solution of a protic acid having a pKa of at most 6, preferably at most 4, more preferably at most 3, at a temperature between 15 to 100° C., preferably between 15 to 40° C., and separating the residual solid (2) from said demineralized water; and either:
(e) contacting the said residual solid (2) comprising the PEEK-PEoEK copolymer with a solvent having a normal boiling point of less than 100° C. at a temperature between 15 to 100° C. and separating the residual solid (3) from said solvent; and
(f) contacting the said residual solid (3) comprising the PEEK-PEoEK copolymer with an aqueous buffer solution having a pH comprised between 6.0 and 7.0, at a temperature between 15 to 100° C., preferably between 15 to 40° C., and separating the residual solid (4) from said aqueous buffer solution; and
(g) drying the so-obtained solid residue to obtain the PEEK-PEoEK copolymer; or
(e') contacting the said residual solid (2) comprising the PEEK-PEoEK copolymer with an aqueous buffer solution having a pH comprised between 6.0 and 7.0, at a temperature between 15 to 100° C., preferably between 15 to 40° C., and separating the said residual solid (3') from said aqueous buffer solution; and
(f') contacting the said residual solid (3') comprising the PEEK-PEoEK copolymer with a solvent having a normal boiling point of less than 100° C. at a temperature between 15 to 100° C. and separating the residual solid (4') from said solvent; and
(g') drying the so-obtained residual solid (4') to obtain the PEEK-PEoEK copolymer In some embodiments, the solid phase isolated in step (a), may be exposed to at least one of comminution, pulverizing, and triturating, so as to be provided under the form of small particles. Generally, the solid phase is ground into a powder.

In step (b), the solid phase comprising the PEEK-PEoEK copolymer may be contacted with a solvent having a normal boiling point of less than 100° C. The solvent having a normal boiling point (i.e., a boiling point under normal pressure of 1 atm) of less than 100° C. is generally selected from polar organic solvents, in particular solvents possessing at least one carbonyl group and/or at least one hydroxyl group. Low boiling point ketones and alcohols are exemplary embodiments thereof. Preferred solvents used in step (b) are those selected from the group consisting of acetone, methyl ethyl ketone, ethanol, methanol, isopropanol, which may be used singly or in admixture.

In step (c), use may be made of demineralized water: methods for providing demineralized water are well-known and their choice is not critical to the extent that the demineralized water possesses an overall Na and Ca concentration of less than 20 ppm, preferably less than 10 ppm, more preferably less than 5 ppm.

In step (d), the solid residue (1) may be contacted with an aqueous solution of a protic acid having a pKa of at most 6, preferably at most 4, most preferably at most 3. The choice of the protic acid is not particularly critical, provided that it complies with the mentioned pKa requirements. Hydrochloric acid, oxalic acid, phosphoric acid, acetic acid, formic acid, and mixtures thereof may be used as suitable protic acids in this step. Preferably the protic acid is at least one of hydrochloric acid, oxalic acid or phosphoric acid. Hydrochloric acid is a preferred acid to be used in this step.

Steps (e) or (f) may be carried out with a solvent having a normal boiling point of less than 100° C. The features described above in connection with the solvent used in step (b) are equally applicable for the selection of solvent used in steps (e) or (f). Further, while different solvents may be used in step (b) and steps (e) or (f), it may be convenient to make use of same solvent in both steps, i.e. in steps (b) and (e) or (b) and (f).

In step (f) or in step (e'), the relevant solid residue may be contacted with an aqueous solution of a protic acid having a pKa of at most 6, preferably at most 4, most preferably at most 3. The choice of the protic acid is not particularly critical, provided it complies with the mentioned pKa requirements. Hydrochloric acid is a preferred acid to be used in this step. Steps (f) and (e') may require the use of an aqueous buffer solution, having a pH comprised between 6.0 and 7.0. While organic buffering agents may be used, it is generally preferred to make use of a phosphate-based buffering system. In steps (f) and (e'), preferable aqueous buffer solutions include at least one of sodium dihydrogen phosphate ($NaH_2PO_4$) and disodium hydrogen phosphate ($Na_2HPO_4$). Preferably, the PEEK-PEoEK copolymer is contacted with a solution including both $NaH_2PO_4$ and $Na_2HPO_4$. The phosphate salts of the solutions used can, for example, be anhydrous, monohydrate, dihydrate or heptahydrate.

The concentration of $NaH_2PO_4$ in the aqueous buffer solution is not particularly limited, but should be sufficient in order for the copolymer to preferably present a phosphorus content of more than 20 ppm. The amount of $NaH_2PO_4$ in the solution is preferably chosen to match the preferred minimal 20 ppm amount of phosphorus atoms attached to the copolymer. The concentration of $NaH_2PO_4$ in the solution is preferably at least 0.002 wt. %, more preferably at least 0.004 wt. %, most preferably at least 0.006 wt. %, most preferably at least 0.01 wt. %.

The concentration of $NaH_2PO_4$ in the solution is preferably at most 0.30 wt. %, more preferably at most 0.20 wt. %, most preferably at most 0.10 wt. %, most preferably at most 0.05 wt. %. The concentration of $Na_2HPO_4$ in the solution is preferably at least 0.002 wt. %, more preferably at least 0.004 wt. %, most preferably at least 0.006 wt. %, most preferably at least 0.02 wt. %. The concentration of $Na_2HPO_4$ in the solution is preferably at most 0.30 wt. %, more preferably at most 0.20 wt. %, most preferably at most 0.10 wt. %, most preferably at most 0.05 wt. %.

In steps (f) and (e'), the PEEK-PEoEK copolymer is advantageously submitted to washing with the aqueous buffering solution, in particular the dihydrogen phosphate ($NaH_2PO_4$) and disodium hydrogen phosphate ($Na_2HPO_4$) solution. As used herein, "washing" the copolymer with a solution including at least one of sodium dihydrogen phosphate ($NaH_2PO_4$) and disodium hydrogen phosphate ($Na_2HPO_4$) may involve substantially fixing phosphate groups on the copolymer. "Substantially fixing" means that the PEEK-PEoEK polymer preferably retains a phosphorus content of more than 20 ppm, as determined by Inductively Coupled Plasma Optical Emission Spectrometry (ICP-OES), for example more than 30 ppm, more than 40 ppm, more than 50 ppm or more than 60 ppm.

In some embodiments, the copolymer is contacted with the aqueous buffer solution for a time ranging from 5 minutes to 5 hours, preferably from 10 minutes to 3 hours. Methods of washing polymers are well known to those of skill in the art, and include, for example, slurrying the polymer with the solution including the acid or base, as defined below, and then filtering off the solution.

Step (g) or (g') comprises drying the solid residue (4)/(4'), to obtain the PEEK-PEoEK copolymer. In this step, drying is generally carried out at a temperature of at least 95° C., for example at least 100° C., for at least one hour, for example at least 2 hours, at least 5 hours, at least 10 hours or 12 hours.

Polymer Matrix Additives

In some embodiments, the polymer matrix comprises at least one additive, other than the PEEK-PEoEK copolymer(s). Such additives include, but are not limited to, (i) colorants such as dyes (ii) pigments such as titanium dioxide, zinc sulfide and zinc oxide (iii) light stabilizers, e.g., UV stabilizers, (iv) heat stabilizers, (v) antioxidants such as organic phosphites and phosphonites, (vi) acid scavengers, (vii) processing aids, (viii) nucleating agents, (ix) internal lubricants and/or external lubricants, (x) flame retardants, (xi) smoke-suppressing agents, (x) anti-static agents, (xi) anti-blocking agents, (xii) conductivity additives such as carbon black and carbon nanofibrils, (xiii) plasticizers, (xiv) flow modifiers, (xv) extenders, (xvi) metal deactivators and (xvii) flow aids such as silica.

In some embodiments, the polymer matrix includes less than 20 wt. % of additives, preferably less than 10 wt. %, more preferably less than 5 wt. % and even more preferably less than 2 wt. % of additives, most preferably less than 1 wt. %.

In some embodiments, the polymer matrix may comprise a blend of more than one polymers, one of which is the PEEK-PEoEK copolymer. According to these embodiments, the polymer matrix may comprise 40 wt. % or less (based on the total weight of polymer matrix) of at least one additional polymer component, different from the PEEK-PEoEK copolymer. Such additional polymer component is advantageously selected from the group consisting of poly(aryl ether sulfone) (PAES) polymers, and poly(aryl ether ketone) (PAEK) polymers. When the additional polymer component is a PAES polymer, it may be advantageously selected from the group consisting of a polysulfone (PSU), a polyphenylsulfone (PPSU), and a poly(ether sulfone) (PES). When the additional polymer component is a PAEK polymer, it may be advantageously selected from the group consisting of a poly(ether ether ketone) (PEEK) polymer, a poly(ether ketone ketone) (PEKK) polymer, a polyetherketone (PEK), a polyetherketoneetherketoneketone (PEKEKK), and a PEEK-PEDEK copolymer. The additional polymer component may also include a polyetherimide (PEI).

In alternative embodiments, the PEEK-PEoEK copolymer, as above detailed, is the only polymeric component in the polymer matrix. As used herein, the expression "polymeric component" means a compound having repeat units and a molecular weight of at least 2,000 g/mol. In some embodiments, the polymer matrix includes less than 3 wt. %, 2 wt. %, 1 wt. %, 0.5 wt. % of a polymeric component other than the PEEK-PEoEK copolymer.

Methods of Making Polymer Matrix

The polymer matrix can be prepared by a variety of methods involving intimate admixing of the components of the polymer matrix, for example by dry blending, suspension or slurry mixing, solution mixing, melt mixing or a combination of dry blending and melt mixing. As used herein, the "components of the polymer matrix" includes the PEEK-PEoEK copolymer and optionally: at least one additive, at least one additional polymer component different from the PEEK-PEoEK copolymer, or a combination thereof.

Typically, the dry blending of the components of the polymer composition is carried out by using high intensity mixers, such as Henschel-type mixers, paddle mixers or ribbon mixers to obtain the polymer matrix as a physical mixture.

Alternatively, the intimate admixing of the components of the polymer matrix is carried out by tumble blending based on a single axis or multi-axis rotating mechanism to obtain a physical mixture.

In another alternative, slurry mixing of the components of the polymer matrix is carried out by slurrying the components of the polymer matrix using an agitator in an appropriate liquid, such as, for example, methanol, followed by filtering the liquid away, to obtain a powder mixture of the components of the polymer composition.

Solution mixing of the components of the polymer matrix can be carried out by mixing the components of the polymer matrix with an agitator in at least one solvent such as, for example, diphenyl sulfone, benzophenone, 4-chlorophenol, 2-chlorophenol, or meta-cresol.

In some embodiments, the method of making the polymer matrix includes melt compounding a physical mixture of the components of the polymer matrix. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

In some embodiments, the physical mixture is compounded in an extruder and then chopped into pellets or granules. The granules or pellets can then be further processed to manufacture the inventive composite materials.

Composite Materials

The present invention is directed, at least in part, to composite materials. As used herein, the term "composite material" generally refers to an assembly of fibers and a polymer matrix material that is either impregnated, coated or laminated onto the fibers. As described further herein, fibrous material formats would include unidirectional tape, textiles such as woven broadgoods including 3D woven broadgoods, braids, towpreg, and non-woven formats. The composite materials of the present invention include a polymer matrix that comprises the PEEK-PEoEK copolymer described herein.

In some aspects, the composite materials of the present invention exhibit a superior combination of handling and mechanical properties, e.g., versus composites comprising known PAEK polymers. In some embodiments, the composite materials of the present invention:
comprise a PEEK-PEoEK copolymer (e.g., the PEEK-PEoEK copolymer defined structurally herein) having a melting temperature of less than or equal to 315° C., preferably less than or equal to 310° C., even more preferably from 295° C. to 310° C. and exhibit at least one mechanical property (e.g., interlaminar shear strength, open hole compression strength, in-plane shear modulus, compression after impact and/or 90/0° compression strength) which approaches, e.g., has a value of at least 90% of, or even at least 95% of, the corresponding mechanical property of a composite material of the same form, but comprising PEKK.

As used herein "a composite material of the same form" refers to a composite material having the same type of fibers (e.g., carbon fiber, glass fiber, etc.) in the same format (e.g., unidirectional, woven, nonwoven, etc.) and only differing in its polymer matrix.

In some embodiments, the composite materials of the present invention comprise a PEEK-PEoEK copolymer (e.g., the PEEK-PEoEK copolymer defined structurally herein) having a melting temperature of less than or equal to 315° C., preferably less than or equal to 310° C., even more preferably from 295° C. to 310° C. and exhibit at least one of:
an interlaminar shear strength of greater than 15 ksi (103 MPa), more typically greater than or equal to 16 ksi (110 MPa), an and even more typically greater than or equal to 17 ksi (117 MPa), as measured in accordance with ASTM D2344;
an open hole compression strength of 47 ksi (324 MPa), more typically greater than or equal to 48 ksi (330 MPa), an and even more typically greater than or equal to 49 ksi (338 MPa), as measured in accordance with ASTM D6484,
an in-plane shear modulus of greater than or equal to 0.68 Msi (4.7 GPa), more typically greater than or equal to 0.70 Msi (4.8 GPa), an and even more typically greater than or equal to 0.72 Msi (5.0 GPa), as measured in accordance with ASTM D3518,
a compression after impact at 1500 in-lb/in (6672 N-m/m) of 35 ksi (241 MPa), more typically greater than or equal to 37 ksi (255 MPa), an and even more typically greater than or equal to 40 ksi (276 MPa), as measured in accordance with ASTM D7137, and/or
a 90/0° compression strength of greater than or equal to 120 ksi (827 MPa), more typically greater than or equal to 130 ksi (896 MPa), an and even more typically greater than or equal to 135 ksi (931 MPa), as measured in accordance with SACMA SRM-1.

In such embodiments, the composite material can be, e.g., unidirectional tape which comprises intermediate modulus carbon fibers and the PEEK-PEoEK copolymer defined structurally herein.

For example, in one embodiment, the PEEK-PEoEK copolymer component of the composite material (e.g., the PEEK-PEoEK copolymer defined structurally herein) has a melt temperature of less than or equal to 315° C., more typically of from 295° C. to 310° C., and the composite material exhibits an interlaminar shear strength of greater than 15 ksi (103 MPa), more typically greater than or equal to 16 ksi (110 MPa), an and even more typically greater than or equal to 17 ksi (117 MPa), as measured in accordance with ASTM D2344. In such embodiments, the composite material can be, e.g., unidirectional tape which comprises intermediate modulus carbon fibers and the PEEK-PEoEK copolymer defined structurally herein.

In one embodiment, the PEEK-PEoEK copolymer component of the composite material (e.g., the PEEK-PEoEK copolymer defined structurally herein) has a melt temperature of less than or equal to 315° C., more typically of from 295° C. to 310° C., and the composite material exhibits a 90/0° compressive strength of greater than or equal to 120 ksi (827 MPa), more typically greater than or equal to 130 ksi (896 MPa), an and even more typically greater than or equal to 135 ksi (931 MPa), as measured in accordance with SACMA SRM-1. In such embodiments, the composite material can be, e.g., unidirectional tape which comprises intermediate modulus carbon fibers and the PEEK-PEoEK copolymer defined structurally herein.

In one embodiment, the PEEK-PEoEK copolymer component of the composite material (e.g., the PEEK-PEoEK copolymer defined structurally herein) has a melt temperature of less than or equal to 315° C., more typically of from 295° C. to 310° C. and the composite material exhibits an interlaminar shear strength of greater than 15 ksi (103 MPa), more typically greater than or equal to 16 ksi (110 MPa), an and even more typically greater than or equal to 17 ksi (117 MPa), as measured in accordance with ASTM D2344, and a 90/0° compressive strength of greater than or equal to 120 ksi (827 MPa), more typically greater than or equal to 130 ksi (896 MPa), an and even more typically greater than or equal to 135 ksi (931 MPa), as measured in accordance with SACMA SRM-1. In such embodiments, the composite material can be, e.g., unidirectional tape which comprises intermediate modulus carbon fibers and the PEEK-PEoEK copolymer defined structurally herein.

Fibers

As used herein, the term "fiber" has its ordinary meaning as known to those skilled in the art and may include one or more fibrous materials adapted for the reinforcement of composite structures, i.e., a "reinforcing fiber". The fibers may be organic fibers, inorganic fibers or mixtures thereof. Suitable fibers for use as the reinforcing fiber component include, for example, carbon fibers, graphite fibers, glass fibers, such as E glass fibers, ceramic fibers such as silicon carbide fibers, synthetic polymer fibers such as aromatic polyamide fibers, polyimide fibers, high-modulus polyethylene (PE) fibers, polyester fibers and polybenzoxazole fibers such as poly-p-phenylene-benzobisoxazole (PBO) fibers, aramid fibers, boron fibers, basalt fibers, quartz fibers, alumina fibers, zirconia fibers and mixtures thereof. Fibers may be continuous or discontinuous and may be aligned or randomly oriented. As referred to herein, "continuous fibers" refer to fibers having a length of greater than or equal to 3 millimeters ("mm"), more typically greater than or equal to 10 mm, and/or an aspect ratio of greater than or equal to 500, more typically greater than or equal to 5000.

As referred to herein, "aligned fibers" means that the majority of the fibers are substantially aligned parallel to one another. For example, in some embodiments, the fibers are aligned when the alignment of each fiber in the group at any one place along at least about 75% of its length (preferably at least about 80%, or even 85% of its length) does not deviate more than about 25 degrees (preferably not more than about 20 degrees, or even 15 degrees) from parallel to the immediately adjacent fibers.

In one embodiment, the fibers comprise carbon fibers, glass fibers, or both carbon fibers and glass fibers.

In some embodiments, the fibers include at least one carbon fiber. As used herein, the term "carbon fiber" is intended to include graphitized, partially graphitized, and ungraphitized carbon reinforcing fibers, as well as mixtures thereof. The carbon fibers can be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" is intended to denote carbon fibers obtained by high temperature pyrolysis (over 2000° C.) of carbon fibers, wherein the carbon atoms place in a way similar to the graphite structure. The carbon fibers are preferably chosen from the group consisting of PAN-based carbon fibers, pitch based carbon fibers, graphite fibers, and mixtures thereof.

It is noted that end uses requiring high-strength composite structures often employ fibers having a high tensile strength (e.g., ≥3500 MegaPascals or "MPa") and/or a high tensile modulus (e.g., >200 GigaPascals or "GPa"). In one embodiment, therefore, the fibers comprise continuous carbon fibers, including, for example, carbon fibers that exhibit a tensile strength of greater than or equal to 3500 MPa and a tensile modulus of greater than or equal to 200 GPa. In one embodiment, the reinforcing fibers comprise continuous carbon fibers having a tensile strength of greater than or equal to 5000 MPa and a tensile modulus of greater than or equal to 250 GPa. In such embodiments, it is preferable that the carbon fibers are aligned, continuous carbon fibers exhibiting a tensile strength of greater than or equal to 3500 MPa and a tensile modulus of greater than or equal to 200 GPa.

The carbon fibers may be sized or un-sized. In one embodiment, the carbon fibers are sized carbon fiber. The appropriate size for a carbon fiber is a size that is thermally compatible with anticipated processing temperatures and may be selected from, for example, polyamideimide, polyetherimide, and polyimide polymers, each of which may optionally include additives, e.g., nucleating agents, to improve the interfacial properties of the fiber.

In some embodiments, the reinforcing fibers include at least one glass fiber. Glass fibers may have a circular cross-section or a non-circular cross-section (such as an oval or rectangular cross-section). When the glass fibers used have a circular cross-section, they preferably have an average glass fiber diameter of 3 to 30 μm, with a particularly preferred average glass fiber diameter of 5 to 12 μm. Different types of glass fibers with a circular cross-section are available on the market depending on the type of the glass they are made of. One may notably cite glass fibers made from E- or S-glass.

In some embodiments, the glass fiber is standard E-glass material with a non-circular cross section. In some embodiments, the polymer composition includes S-glass fibers with a circular cross-section.

Fibers suitable for manufacturing the composite material of the invention may be included in the composite material in a number of different forms or configurations, which vary depending on the application of the targeted composite material. For example, the reinforcing fibers may be provided in the form of continuous fibers, sheets, plies, and combinations thereof. Continuous fibers may further adopt any of unidirectional, multi-dimensional, non-woven, woven, knitted, non-crimped, web, stitched, wound, and braided configurations, as well as swirl mat, felt mat, and chopped mat structures. The fiber tows may be held in position in such configurations by cross-tow stitches, weft-insertion knitting stitches, or a small amount of resin, such as a sizing. Fibers may also be included as one or multiple plies across all or a portion of the composite material, or in the form of pad-ups or ply drops, with localised increases/decreases in thickness. The areal weight of a single layer or cross section of such fibers can vary, for example, from 50 to 600 g/m$^2$.

In some embodiments, continuous fibers suitable for use in connection with the composite materials of the present invention may be in the form of rovings or tows (including individual tows or rovings, tow/roving bundles or spread tows). Rovings generally refer to a plurality of continuous untwisted filaments of fiber, e.g., glass fiber, optionally reinforced with a chemical binding material. Similarly, tows generally refer to a plurality of continuous individual filaments, e.g., carbon filaments, optionally with an organic coating. The size of the rovings or tows used herein is not particularly limited, but exemplary tows can include, e.g., aerospace-grade tow sizes, which typically range from 1K to 24K and commercial-grade tows, which typically range from 48K to 320K. The tows may be bundled or spread (e.g., untwisted) as required for the end use. For example, use of a spread tow can not only reduce the thickness of the tow, but can also reduce the incidence of gaps between individual tows in a composite material. This can lead to a weight savings in the composite laminate, while potentially achieving the same or better performance.

In some embodiments, the fibers may be discontinuous, e.g., aligned discontinuous fibers. Such discontinuous tows may have random lengths (e.g., created by random breakage of individual filaments) or may have roughly uniform lengths (e.g., created by cutting or separating individual filaments). Use of discontinuous fibers can allow individual fibers to shift position in relation to adjacent fibers, thus impacting the pliability of the material and potentially aiding in forming, draping, and stretching the fibers.

In some embodiments, fibers suitable for use in connection with the composite materials of the present invention may be in the form of unidirectional tapes. As used herein, "tape" means a strip of material with longitudinally extending fibers that are aligned along a single axis of the strip material. Tapes are advantageous because can be used in hand or automated layup processes in order to create a composite material having relatively complex shape. In one embodiment, the composite material comprises a unidirectional continuous-fiber reinforced tape.

In some embodiments, fibers suitable for use in connection with the composite materials of the present invention may be in the form of non-woven fabrics, such as mats. Non-woven fabrics include fibers (continuous or discontinuous) in a randomly-oriented arrangement. Because the fibers are randomly oriented, non-woven fabrics are generally isotropic, possessing substantially equal strength in all directions.

In still other embodiments, fibers suitable for use in connection with the composite materials of the present invention may be in the form of woven fabrics, which are typically woven on looms in a variety of weights, weaves and widths. Woven fabrics are generally bidirectional, providing good strength in the directions of fiber axial orientation (0°/90°). While woven fabrics can facilitate fast composite fabrication, the tensile strength may not be as high as, e.g., non-woven fabrics due to fiber crimping during the weaving process. In some embodiments, the woven fabric is in the form of a woven roving, where continuous fiber rovings are interlaced into fabrics. Such woven rovings may be thick and therefore used for heavy reinforcement, e.g., in hand layup operations and tooling applications. Optionally, such woven rovings may include fine fiberglass and, therefore, can be used for applications such as reinforcing printed circuit boards. Hybrid fabrics can also be constructed, using varying fiber types, strand compositions and fabric types.

In some embodiments, fibers suitable for use in connection with the composite materials of the present invention may be in the form of braided fabrics. Braided fabrics are generally obtained by interlacing three or more fibers (e.g., in the form of tows or rovings) in such a way that they cross one another and are laid together in diagonal formation, forming a narrow strip of flat or tubular fabric. Braided fabrics are generally continuously woven on the bias and have at least one axial yarn that is not crimped in the braiding process. Intertwining the fibers without twisting typically leads to a greater strength to weight ratio than found in woven fabrics. Braided fabrics, which can easily conform to various shapes, can be made in a sleeve-type format or in a flat fabric form. Flat braided fabrics can be produced with a triaxial architecture, having fibers oriented at 0°, +60° and −60° within a single layer, which can eliminate problems associated with layering of multiple 0°, +45°, −450 and 900 fabrics—including delamination. Because the fibers in the braided structure are interlocked, and therefore involved in a loading event, the load is evenly distributed throughout the structure. Therefore, braided fabrics can absorb a great deal of energy and exhibit very good impact resistance, damage tolerance and fatigue performance.

In some embodiments, the composite material of the invention is provided in the form of a substantially bidimensional material, e.g., material having one dimension (thickness or height) that is significantly smaller than the other two dimensions (width and length), such as sheets and tapes. In certain preferred embodiments, the composite material of the invention is selected from the group consisting of
  plies of impregnated fabrics, including but not limited to non-woven fabrics such as mats, multiaxial fabrics, woven fabrics or braided fabrics; and
  unidirectional (continuous or discontinuous) fiber reinforced tapes or prepregs, preferably where the fibers are aligned.

According to certain embodiments, fibers are provided as a preform. Preforms are made by stacking and shaping layers of one or more of the above forms into a predetermined three-dimensional form. Preforms can be particularly desirable because complex part shapes can be approximated closely by careful selection of layers.

Composite materials of the present invention typically include on the basis of 100 parts by weight of the composition, from 30 to 80 parts by weight, e.g., from 50 to 80 parts by weight, or even 55 to 75 parts by weight, of the fiber and from 20 to 70 parts by weight, e.g., from 20 to 50 parts by weight, or even 25 to 45 parts by weight, of the polymer matrix comprising the PEEK-PEoEK copolymer.

In one embodiment, the composite material comprises from 30 to 80, e.g., from 50 to 80, more typically 55 to 75 wt % of continuous carbon fibers and 20 to 70, more typically 25 to 45 wt % of a polymer matrix that comprises the PEEK-PEoEK copolymer. In one embodiment of the composite material, the fibers are continuous carbon fibers that are substantially aligned along a single axis and the composite material is in the form of a unidirectional carbon fiber reinforced resin matrix tape that comprises from 50 to 80 wt % of carbon fiber and from 20 to 50 wt % of a polymer matrix that comprises the PEEK-PEoEK copolymer. In one embodiment of the composite material, the continuous carbon fibers are in the form of a woven or non-woven fabric and the composite material comprises from 45 to 70 wt % of continuous carbon fiber and from 30 to 55 wt % of a polymer matrix that comprises the PEEK-PEoEK copolymer.

In one embodiment, the composite material comprises from 30 to 80, more typically 50 to 75 wt % of continuous glass fibers and 20 to 70, more typically 25 to 45 wt % of the PEEK-PEoEK copolymer. In one embodiment of the composite material, the fibers are continuous glass fibers that are substantially aligned along a single axis and the composite material in the form of a unidirectional glass fiber reinforced resin matrix tape that comprises from 65 to 80 wt % glass fibers and from 20 to 35 wt % of a polymer matrix that comprises the PEEK-PEoEK copolymer. In one embodiment the composite material, the continuous fibers are glass fibers in the form of a woven or non-woven glass fabric and the composite material comprises from 50 to 70 wt % glass fibers and from 30 to 50 wt % of a polymer matrix that comprises the PEEK-PEoEK copolymer.

In one embodiment, the composite material has a fiber areal weight of from 50 to 400 grams per square meter. For unidirectional tape, the composite material has a typical fiber areal weight of from 130 to 200 grams per square meter. For fabric, the composite material has a typical fiber areal weight of from 170 to 400 grams per square meter.

Methods of Making Composite Material

Various methods can be employed to bring the polymer matrix into contact with the fibers, thus providing the composite material of the invention. Such methods, in which the matrix may be either in molten or particulate form, include powder coating, film lamination, extrusion, pultrusion, aqueous slurry, and melt impregnation, among others, to form plies in the form of, for example, sheets or tapes of fibers that are at least partially impregnated with matrix material.

The polymer matrix can also be made into a film form, either as neat PEEK-PEoEK copolymer or as a polymer blend with one of the previously mentioned polymer additives. Such films can be laminated and or coated onto a tape with either PEEK-PEoEK copolymer as the matrix or a higher melting, faster crystallizing PAEK matrix to make a multi-layered tape. Without wishing to be bound by any particular theory, it is believed that this method can lower the melt processing temperature of the tape in the automated placement laydown process and/or improve the toughness of the composite system. Such a method is described in U.S. Pat. No. 8,158,245 (Pratte, et a).

In one embodiment that the composite material comprises a unidirectional continuous fiber reinforced tape made by a melt impregnation process. Melt impregnation process generally comprises drawing a plurality of continuous filaments through a melted precursor composition that comprises the PEEK-PEoEK copolymer. The precursor composition may additionally comprise specific ingredients such as plasticizers and processing aids, which facilitate impregnation. Melt impregnation processes include direct melt and aromatic polymer composite ("APC") processes, such as, for example, as described in EP 102158.

In one embodiment the composite material comprises a unidirectional continuous fiber reinforced tape made by a slurry process. An exemplary slurry process can be found, for example, in U.S. Pat. No. 4,792,481 (O'Connor, et al). According to this embodiment, the method of making the composite material may include:

contacting a fiber with a slurry, said slurry comprising particles of PEEK-PEoEK copolymer suspended in a slurry liquid, to form a slurry-impregnated fiber;

heating the slurry-impregnated fiber to a temperature sufficient to evaporate the slurry liquid and to melt the PEEK-PEoEK copolymer, thus forming a molten matrix-impregnated fiber, subjecting the molten matrix-impregnated fiber to a compressive force, thus forming a fiber-reinforced continuous polymer matrix, and cooling the fiber-reinforced continuous polymer matrix to a temperature below the melting temperature of the PEEK-PEoEK copolymer.

In the slurry process, it is preferable that the fiber is stable at the melting temperature of the PEEK-PEoEK copolymer. In some embodiments, the fiber is in continuous form, such as a roving or tow, and the fiber is passed through the slurry to form the slurry-impregnated fiber.

In one embodiment, the composite material comprises either a unidirectional continuous fiber reinforced tape or woven/non-woven fiber reinforcement (e.g., fabric) made by a film lamination process either through a series of heated and chilled rolls or a double belt press.

Film lamination processes generally include disposing at least one layer of fibrous material on or between at least one layer of polymer matrix (e.g., a polymer matrix film) to form a layered structure, and passing the layered structure through the series of heated and chilled rolls or through the double belt press.

In one embodiment, the composite material comprises either a unidirectional continuous fiber reinforced tape or woven/non woven fiber reinforcement (e.g., fabric) made by a dry powder coating/fusion process where dry powder is deposited uniformly on the fibers or fiber web (e.g., fabric) and subsequently heat is applied to fuse the powder to the fibers or fiber web (e.g., fabric).

The composite material of the invention may be in the form of plies of matrix impregnated fibers. A plurality of plies may be placed adjacent one another to form an unconsolidated composite laminate, such as a prepreg. The fiber reinforced layers of the laminate may be positioned with their respective fiber reinforcements in selected orientations relative to one another.

Composite laminates may be manufactured by depositing, or "laying up" layers of composite material on a mold, mandrel, tool or other surface. This process is repeated several times to build up the layers of the final composite laminate.

The plies may be stacked, manually or automatically, e.g., by automated tape layup (ATL) using "pick and place" robotics, or automated fiber placement (AFP) wherein preimpregnated tows of fibers are heated and compacted in a mold or on a mandrel, to form a composite laminate having desired physical dimensions and fiber orientations. AFP and ATL are techniques generally employ a tape supply reel; a tape driving and cutting device; and a compaction roller or shoe that impresses the tape on to the surface of the part in process.

The fiber reinforced tape is typically heated at the tape head and compaction pressure is applied by means of compaction roller to insure proper adhesion of the tape to the working surface or to previously applied layers of tapes. The AFP or ATL machine can lay the tape in a computer-controlled path, controlling the location and angle of the cuts, allowing any number and variety of final two-dimensional structures and orientations.

The layers of an unconsolidated laminate are typically not completely fused together and the unconsolidated composite laminate may exhibit a significant void content, e.g., greater than 20% by volume. Heat and/or pressure may be applied, or sonic vibration welding may be used, to stabilize the laminate and prevent the layers from moving relative to one another, e.g., to form a composite material "blank", as an intermediate step to allow handling of the composite laminate prior to consolidation of the composite laminate.

The composite laminate so formed is subsequently consolidated, typically by subjecting the composite laminate to heat and pressure, e.g., in a mold, to form a shaped fiber reinforced thermoplastic matrix composite article. As used herein, "consolidation" is a process by which the matrix material is softened, the layers of the composite laminate are pressed together, air, moisture, solvents, and other volatiles are pressed out of the laminate, and the adjacent plies of the composite laminate are fused together to form a solid, coherent article.

Ideally, the consolidated composite article exhibits minimal, e.g., less than 5% by volume, more typically less than 2% by volume, void content. Accordingly, in some embodiments, the present invention is directed to methods for consolidating the composite materials disclosed herein. This method includes stacking or otherwise arranging a plurality of plies, such that at least one surface of each ply is in contact with at least one surface of at least one other ply, and fusing the plies together to form an article having less than 5% by volume, more typically less than 2% by volume, void content.

In one embodiment, the composite material is consolidated in a vacuum bag process in an autoclave or oven. In one embodiment, the composite material is consolidated in vacuum bag process under a vacuum of greater than 600 mm Hg by heating to a consolidation temperature of greater than 320° C., more typically from 330° C. to 360° C., and once consolidation temperature is reached, pressure, typically from 0 to 20 bars, is applied for a time, typically from 1 minute to 240 minutes and then allowed to cool. Overall cycle time, including heating, compression, and cooling, is typically within 8 hours or less, depending on the size of the part and the performance of the autoclave.

In one embodiment, the composite material is laminated by an automated lay-up machine (ATL, AFP or filament wind) outfitted with a heat device to simultaneously melt and fuse the layer to the previous laid layer as it is being placed and oriented on the previous laid layer to form a low void, consolidated laminate (<2% volume of voids). This low void consolidated laminate can be used "as is" or subsequently annealed in either a free standing or vacuum bag operation typically in temperature range of 170° C. to 270° C. for a time from 1 minute to 240 minutes.

In one embodiment, the fully impregnated composite prepreg material plies are laminated by an automated lay-up machine outfitted with a heat device to simultaneously melt and fuse the layer to the previous layer as it is being placed and oriented on the previous laid layer to form a preform with a void content >2%. The preform is then subsequently consolidated in either a "vacuum bag process" as described earlier, compression mold, stamp form, or continuous compression molding process.

In one embodiment, the fully impregnated composite prepreg material plies are pre-oriented and consolidated in a heated and cooled press, double belt press or continuous compression molding machine to make a consolidated laminate that can be cut to size to be a forming blank in a stamp forming process where tool temperature range from 10° C. to 270° C. and the forming blank is heated rapidly to the melt processing temperature of 320° C. to 360° C. before shaping and consolidating the molten blank in the tool. The resulting part can be used "as is" or in a subsequent step of placing said formed part in an injection molding tool to rapidly heat the laminate to an intermediate temperature to inject a higher melt processing temperature PAEK polymer such as PEEK in neat or filled form to make a complex shaped hybrid part.

Molded articles prepared from the composite materials of the present invention are particularly suitable as components for applications in the aerospace and automotive industries. For example, components prepared from the composite materials of the present invention can include, but are not limited to, brackets, clips, stiffeners and other similar type parts.

Exemplary embodiments will now be described in the following non-limiting examples.

Exemplification

Raw Materials 1,2-dichlorobenzene, terephthaloyl chloride, isophthaloyl chloride, 3,5-dichlorobenzoylchloride, aluminum chloride ($AlCl_3$), methanol were purchased from Sigma Aldrich.

1,4-Bis(4-phenoxybenzoyl)benzene was prepared according to IN patent 193687 (filed on Jun. 21, 1999 and incorporated herein by reference).

Hydroquinone, photo grade, was procured from Eastman, USA. It contained 0.38 wt % moisture, which amount was used to adapt the charge weights. All weights indicated include moisture.

Resorcinol, ACS reagent grade, was procured from Aldrich, USA 4,4'-Biphenol, polymer grade, was procured from SI, USA.

Pyrocatechol, flakes, was procured from Solvay USA. Its purity was 99.85% by GC. It contained 680 ppm moisture, which amount was used to adapt the charge weights. All weights indicated include moisture.

4,4'-Difluorobenzophenone, polymer grade (99.8%+), was procured from Malwa, India Diphenyl sulfone (polymer grade) was procured from Proviron (99.8% pure).

Sodium carbonate, light soda ash, was procured from Solvay S.A., France.

Potassium carbonate with a $d_{90}$<45 μm was procured from Armand products.

Lithium chloride (anhydrous grade) was procured from Acros.

1,4-bis(4'-fluorobenzoyl)benzene (1,4-DFDK) and 1,3 bis (4'-fluorobenzoyl)benzene (1,3-DFDK) were prepared by Friedel-Crafts acylation of fluorobenzene according to Example 1 of U.S. Pat. No. 5,300,693 to Gilb et al. (filed Nov. 25, 1992 and incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-DFDK in the polymerization reactions to make PEKK described below, while 1,4-DFDK recrystallized in chlorobenzene was used as precursor for 1,4-bis(4'-hydroxybenzoyl)benzene (1,4-BHBB).

1,4-BHBB and 1,3-bis(4'-hydroxybenzoyl)benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (filed Feb. 24, 1992 and incorporated herein by reference in its entirety). They were purified by recrystallization in DMF/ethanol.

Determination of the Melting Temperature (Tm), Crystallization Temperature (Tc) and Heat of Fusion The melting temperature Tm was determined as the peak temperature of the melting endotherm on the $2^{nd}$ heat scan in differential scanning calorimeter (DSC) according to ASTM D3418-03, E1356-03, E793-06, and E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

1st heat cycle: 30.00° C. to 360.00° C. at 10.00° C./min, isothermal at 360.00° C. for 1 min;
1st cool cycle: 360.00° C. to 30.00° C. at 10.00° C./min, isothermal for 1 min;
2nd heat cycle: 30.00° C. to 360.00° C. at 10.00° C./min, isothermal at 360.00° C. for 1 min.

The melting temperature Tm was determined as the peak temperature of the melting endotherm on the $2^{nd}$ heat scan. The enthalpy of fusion was determined on the $2^{nd}$ heat scan.

For PEKK FC (Comp. example 1), the same heat cycles were used but up to a temperature of 400° C.

The melting of the composition was taken as the area over a linear baseline drawn from 220° C. to a temperature above the last endotherm.

The crystallization temperature Tc was determined as the peak temperature of the crystallization exotherm on the $1^{st}$ cool scan.

The glass transition temperature Tg (mid-point) was determined on the $2^{nd}$ heat scan according to ASTM D3418-03, E1356-03, E793-06, E794-06.

Determination of the Melt Viscosity

The melt viscosity was measured using a capillary rheometer according to ASTM D3835. Readings were taken after 10-minute and 40-minute dwell time at 380° C. and a shear rate of 46.3 s-1 using a die with the following characteristics: diameter=1.016 mm, length=20.32 mm, cone angle=120°.

Determination of Tensile Properties by Injection Molding

Type V bars were injection molded on DSM Xplore® Micro Compounder using the following conditions:
Compounding:
barrel temperature (top, middle, bottom): 360° C.
75-100 rpm screw speed
4-minute residence time
Molding
Mod temperature: 155° C.
Wand temperature: 345° C.
Molding steps conditions:
12 bar/5s
10 bar/0.5 s
10 bar/5 s The molded tensile bars were then annealed at 200° C. for 3 hours. subjected to tensile testing according to ASTM method D638 at 0.05 inch/minute room temperature (i.e. 23° C.) on 5 specimens. The average of the 5 specimens is presented.

PREPARATIVE EXAMPLES

Comparative Example 1: e-PEKK, 70/30 T/I Ratio

In a 2000 mL 4-neck reaction flask fitted with a stirrer, a dry $N_2$ inlet tube, a thermocouple plunging in the reaction medium, and a condenser were introduced 1000 g 1,2-dichlorobenzene and 40.63 g 1,4-Bis(4-phenoxybenzoyl)benzene. Under a sweep of dry nitrogen, 7.539 g of terephthaloyl chloride, 9.716 g of isophthaloyl chloride and 0.238 g of benzoyl chloride were then added to the reaction mixture. The reactor was then cooled to −5° C. and 71.88 g of aluminum chloride ($AlCl_3$) were added slowly while keeping the temperature below 5° C. The reaction was held at 5° C. for 10 minutes then the temperature of the mixture was increased to 90° C. at 5° C./minute. The reaction mixture was held at 90° C. for 30 minutes then cooled down to 30° C. At 30° C., 250 g of methanol were added slowly to maintain the temperature below 60° C. After the end of the addition, the reaction mixture was kept under agitation for 2 hours then cooled down to 30° C.

The solid was then removed by filtration on a Buchner. The wet cake was rinsed on the filter with an additional 188 g of methanol. The wet cake was then reslurried in a beaker with 440 g of methanol for 2 hours. The polymer solid was filtered again on Buchner funnel and the wet cake was rinsed on the filter with 188 g of methanol. The solid was slurried with 470 g of an aqueous hydrochloric acid solution (3.5 wt %) for 2 hours. The solid was then removed by filtration on a Buchner. The wet cake was rinsed on the filter with an additional 280 g of water. The wet cake was then reslurried in a beaker with 250 g of 0.5N sodium hydroxide aqueous solution for 2 hours. The wet cake was then reslurried in a beaker with 475 g of water and filtered on Buchner funnel. The last water washing step was repeated 3 more times. The polymer is then slurried with 0.75 g of an aqueous solution containing 6.6 wt % of $NaH_2PO_4.2H_2O$ and 3.3 wt % of $Na_2HPO_4$. then dried in a vacuum oven at 180° C. for 12 hours.

The properties of the final polymer are detailed in Table 4

Comparative Example 2: PEKK, Approx. 60/40 Unit Ratio

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 112.50 g of diphenyl sulfone, 33.390 g of 1,3-BHBB, 6.372 g of 1,4-BHBB and 41.051 g of 1,4-DFDK. The flask content was evacuated under vacuum and then filled with high purity nitrogen (containing less than 10 ppm 02). The reaction mixture was then placed under a constant nitrogen purge (60 mL/min).

The reaction mixture was heated slowly to 270° C. At 270° C., 13.725 g of $Na_2CO_3$ and 0.086 g of $K_2CO_3$ was added via a powder dispenser to the reaction mixture over 60 minutes. At the end of the addition, the reaction mixture was heated to 320° C. at 1° C./minute. After 2 minutes at 320°

C., 1.207 g of 1,4-DFDK were added to the reaction mixture while keeping a nitrogen purge on the reactor. After 5 minutes, 0.529 g of lithium chloride were added to the reaction mixture. 10 minutes later, another 0.503 g of 1,4-DFDK were added to the reactor and the reaction mixture was kept at temperature for 15 minutes. Another charge of 25 g of diphenyl sulfone was added to the reaction mixture, which was kept under agitation for 15 minutes.

The reactor content was then poured from the reactor into a stainless steel pan and cooled.

The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 72 g of a yellow powder.

The properties of the final polymer are detailed in Table 4

Comparative Example 3: PEEK-PEDEK Copolymer, 75/25 Unit Ratio

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 128.21 g of diphenyl sulfone, 20.297 g of hydroquinone, 11.411 g of 4,4'-biphenol and 54.377 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.955 g of $Na_2CO_3$ and 0.169 g of $K_2CO_3$ was added via a powder dispenser to the reaction mixture over 30 minutes. At the end of the addition, the reaction mixture was heated to 320° C. at 1° C./minute. After 13 minutes at 320° C., 3.742 g of 4,4'-difluorobenzophenone were added to the reaction mixture while keeping a nitrogen purge on the reactor. After 5 minutes, 1.039 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder.

The repeat unit of the polymer is:

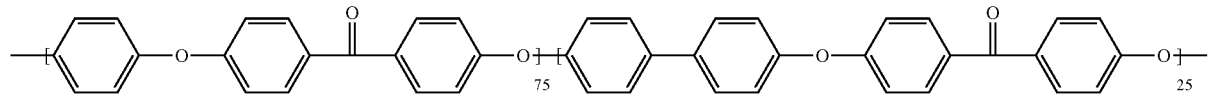

The properties of the final polymer are detailed in Table 4.

Comparative Example 4: PEEK-PEDEK Copolymer, 75/25 Unit Ratio

The same procedure as Comparative Example 3 was followed but with the following reagents amounts:

TABLE 1

| reagents for Example 4a | |
|---|---|
| | CE4a |
| PEEK/PEDEK | 75/25 |
| Reagent | Wt (g) |
| Diphenyl sulfone | 128.21 |
| Hydroquinone | 20.158 |
| 4,4'-biphenol | 11.322 |
| 4,4'-difluorobenzophenone | 53.520 |
| $Na_2CO_3$ | 26.744 |
| $K_2CO_3$ | 0.168 |
| Time at 320° C. (minutes) | 16 |
| 4,4'-difluorobenzophenone in first termination | 3.713 |
| Lithium chloride in second termination | 1.031 |
| 4,4'-difluorobenzophenone in third termination | 2.122 |

The material of comparative example 4a was blended with the material from Comparative Example 3 (40/60 wt/wt) to prepare material of Comparative Example 4. The properties of the final polymer are detailed in Table 4.

Comparative Example 5a: PEEK-PEmEK Copolymer, 75/25 Unit Ratio

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 338.33 g of diphenyl sulfone, 41.665 g of hydroquinone, 13.863 g of resorcinol and 112.593 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 55.482 g of $Na_2CO_3$ and 0.174 g of $K_2CO_3$ was added via a powder dispenser to the reaction mixture over 30 minutes. At the end of the addition, the reaction mixture was heated to 300° C. at 1° C./minute. After 36 minutes at 300° C., 13.169 g of 4,4'-difluorobenzophenone were added to the reaction mixture while keeping a nitrogen purge on the reactor. After 5 minutes, 2.132 g of lithium chloride were added to the reaction mixture. 10 minutes later, another 4.390 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 100° C. under vacuum for 12 hours yielding 165 g of a light brown powder.

The repeat unit of the polymer is:

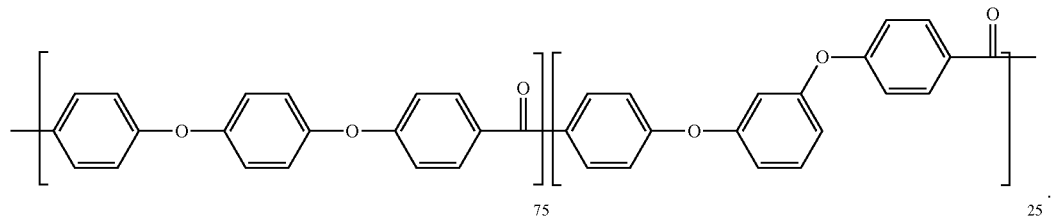

Comparative Example 5b: PEEK-PEmEK Copolymer, 75/25 Unit Ratio

The same procedure as Comparative Example 5a was followed but with the following reagents amounts:

TABLE 2

| reagents for Example 5b | |
|---|---|
| | CE5b |
| PEEK/PEmEK | 75/25 |
| Reagent | Wt (g) |
| Diphenyl sulfone | 338.33 |
| Hydroquinone | 41.868 |
| Resorcinol | 13.863 |
| 4,4'-difluorobenzophenone | 112.593 |
| $Na_2CO_3$ | 55.437 |
| $K_2CO_3$ | 0.174 |
| Time at 320° C. (minutes) | 25 |
| 4,4'-difluorobenzophenone in first termination | 13.169 |
| Lithium chloride in second termination | 2.132 |
| 4,4'-difluorobenzophenone in third termination | 4.390 |

The material of Comparative Example 5b was blended with the material from comparative example 5a (40/60 wt/wt) to prepare material of Comparative Example 5. The properties of the final polymer blend are detailed in Table 4.

Example 6: PEEK-PEoEK Copolymer, 80/20 Unit Ratio

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 343.63 g of diphenyl sulfone, 61.852 g of hydroquinone, 15.426 g of pyrocatechol and 154.573 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 76.938 g of $Na_2CO_3$ and 0.484 g of $K_2CO_3$ was added via a powder dispenser to the reaction mixture over 30 minutes. At the end of the addition, the reaction mixture was heated to 320° C. at 1° C./minute. After 24 minutes at 320° C., the reaction was terminated in 3 stages: 18.329 g of 4,4'-difluorobenzophenone were added to the reaction mixture while keeping a nitrogen purge on the reactor. After 5 minutes, 2.388 g of lithium chloride were added to the reaction mixture. 10 minutes later, another 6.110 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture by extracting successively with acetone and water at room temperature. The powder was then dried at 120° C. under vacuum for 12 hours yielding 189 g of a white powder.

The repeat unit of the polymer is:

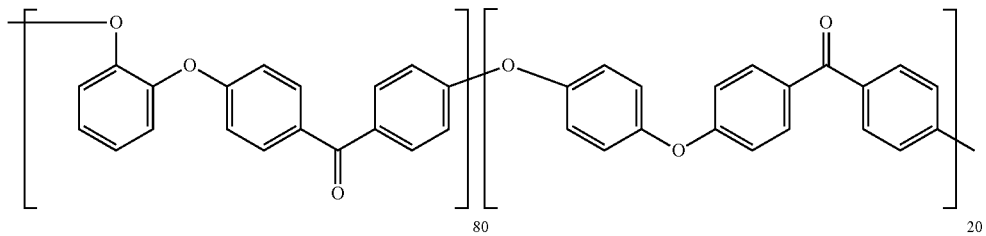

The properties of the polymer are disclosed in Table 4 below.

Examples 7-9: PEEK-PEoEK Copolymers, 80/20 Unit Ratio and 75/25 Unit Ratio

The same procedure as example 6 was followed but with the following reagents amounts:

TABLE 3

Examples 7-9 reagents

| Reagent | Units | E7a | E8 | E9 |
|---|---|---|---|---|
| PEEK/PEoEK | | 80/20 | 75/25 | 75/25 |
| Diphenyl sulfone | g | 343.63 | 343.63 | 343.63 |
| Hydroquinone | g | 61.896 | 57.987 | 58.028 |
| Pyrocatechol | g | 15.426 | 19.282 | 19.282 |
| 4,4'-difluorobenzophenone | g | 154.721 | 154.573 | 154.571 |
| $Na_2CO_3$ | g | 76.936 | 76.938 | 76.936 |
| $K_2CO_3$ | g | 0.484 | 0.484 | 0.484 |
| Time at 320° C. | minutes | 15 | 7 | 4 |
| 4,4'-difluorobenzophenone in first termination | g | 10.692 | 18.329 | 10.692 |
| Lithium chloride in second termination | g | 2.968 | 2.388 | 2.968 |
| 4,4'-difluorobenzophenone in third termination | g | 6.110 | 6.110 | 6.110 |
| Polymer weight | g | 189 | 190 | 185 |

The material of Example 7a was blended with the material from example 6 (40/60 wt/wt) to prepare material of Example 7. The properties of the polymers of Examples 7-9 are detailed in Table 4.

The data presented in Table 4 shows that PEEK-PEoEK is a low Tm PAEK with the following advantages over known low Tm PAEKs:

TABLE 4

Neat polymer properties of the samples prepared according to Examples CE1-E9

| Property | Units | CE1 PEKK CYPEK® FC | CE1 PEKK FC | CE2 PEKK 60/40 | CE3 | CE4 (blend) | CE5 |
|---|---|---|---|---|---|---|---|
| PAEK unit | | PEKK | PEKK | PEKK | PEDEK | PEDEK | PEmEK |
| PEEK/PAEK ratio (mol/mol) | | | | | 75/25 | 75/25 | 75/25 |
| MV (380° C., 46 $s^{-1}$) | $kN-s/m^2$ | 0.46 | 0.45 | 0.60 | 0.33 | 0.55 | 0.65 |
| Tg | ° C. | 156 | 163 | 158 | 151 | 155 | 138 |
| Tm | ° C. | 339 | 345 | 303 | 307 | 307 | 304 |
| Tc | ° C. | 275 | 298 | 214 | 255 | 255 | 234 |
| Heat of fusion | J/g | 38 | 52 | 7 | 39 | 42 | 44 |
| Tensile strength at yield by IM[a] | Psi (MPa) | N/A | N/A | N/A | N/A | 13000 (90) | 15500 (107) |
| Tensile (Young) modulus by IM | Ksi (MPa) | N/A | N/A | N/A | N/A | 467 (3220) | 606 (4178) |

| Property | E6 | E7 (blend) | E8 | E9 |
|---|---|---|---|---|
| PAEK unit | PEoEK | PEoEK | PEoEK | PEoEK |
| PEEK/PAEK ratio (mol/mol) | 80/20 | 80/20 | 75/25 | 75/25 |
| MV (380° C., 46 $s^{-1}$) | 0.34 | 0.30 | 0.30 | 0.28 |
| Tg | 144 | 146 | 143 | 144 |
| Tm | 306 | 307 | 296 | 297 |
| Tc | 245 | 243 | 224 | 233 |
| Heat of fusion | 31 | 42 | 26 | 39 |
| Tensile strength at yield by IM[a] | 14700 (101) | N/A | 14700 (101) | N/A |
| Tensile (Young) modulus by IM | 533 (3675) | N/A | 520 (3585) | N/A |

[a]IM = injection molding

Increased crystallinity over PEKK for the same Tm, as shown by value of heat of fusion More consistent processing than PEKK due to the existence of a single crystal form (see Zhen et al, Macromol. Chem. Phys., 1996, V 197, P 185-213), as can be confirmed by the presence of single Tm in the first heat of the polymer Higher Tg than PEEK-PEmEK, hence higher continuous use temperature Improved mechanical properties over PEEK-PEDEK as measured on injection molded specimens (compare the tensile strength and tensile modulus of CE3 to that of E6 and E8)

Example 10: Manufacture of Composite Materials as Continuous Filament Carbon Fiber Unitape Continuous filament carbon fiber unitape prepregs were formulated using certain polymer matrices of Examples C1-9, as described in Table 5:

TABLE 5

| Tape Prepreg Example No. | T1C | T2C | T3C | T4 | T5 |
|---|---|---|---|---|---|
| Polymer matrix from example | CE1 | CE3 | CE5 | E7 | E9 |
| Polymer | PEKK FC* | PEEK-PEDEK (75/25) | PEEK-PEmEK (75/25) | PEEK-PEoEK (80/20) | PEEK-PEoEK (75/25) |

Such prepregs were made using a melt impregnation process as fundamentally described in EP 102158 (using different equipment). The carbon fiber used was an intermediate modulus carbon fiber (Hexcel IM7, 12,000 filaments, unsized, Tensile Strength=5654 MPa and Tensile modulus=276 GPa) and a sufficient number of fibers were used to make a 305 mm wide unidirectional tape. The resulting unitape prepregs had a nominal resin content of 34 weight percent and a fiber areal weight of 145 grams per meter square. The prepreg tape was cut and manually laid up with the plies being lightly tacked together with a soldering iron into various lay-ups in preparation for autoclave consolidation. The lay-ups were vacuum bagged using high temperature polyimide film for the bagging film. A straight ramp consolidation autoclave cycle was employed which used 685-760 mm Hg vacuum on the lay-up at the start of the cycle and then heated to the consolidation temperature (350° C. for PEEK-PEoEK and PEEK-PEmEK, 360° C. for PEEK-PEDEK, 375° C. for PEKK FC) with a heating rate of 3-7° C./minute. Once the maximum consolidation temperature was reached, 6.8 bars of pressure was applied and held for the specified period of time before being cooled.

The cool down rate which is also done under the same vacuum level is 3-5° C./minute.

The test panels were removed from the autoclave and then ultrasonic scanned to ensure good consolidation (less than 2% void content) before machining the laminates into test coupons for the mechanical test to be performed. Five coupons were tested for each test and prepreg type. Table 6 shows the mechanical property comparison between the prepregs.

The test methods employed for the mechanical tests were:
ASTM D3039 (0° Tension Strength & Modulus),
ASTM D2344 (Inter-laminar Shear Strength or "ILSS"),
ASTM D6484 (Open Hole Compression Strength or "OHC"),
ASTM D3518 (In-plane Shear, or "IPS", Strength and Modulus),
ASTM D790 (90° Flex Strength and Modulus),
ASTM D7137 (Compression after impact, or "CAI", at 1500 in-lb/in, and Damage area, 6 db),
ASTM D5528 (Interlaminar fracture toughness or "Gic**" and propagated strain energy release rate or "Glp"),
ASTM D6641 (Combined Loading Compression, or "CLC", Strength and Modulus) and SACMA SRM-1 (90/0° Compression Strength).

TABLE 6

| Property | Unit | Cond. | T1C | T2C | T3C | T4 | T5 |
|---|---|---|---|---|---|---|---|
| IPS Modulus | Msi (GPa) | RTA** | 0.770 (5.309) | 0.625 (4.309) | 0.754 (5.200) | 0.730 (5.033) | 0.71 (4.895) |
| IPS Strength @ 5% Shear Str. | ksi (MPa) | RTA | 12.1 (83.4) | 9.3 (64.1) | 9.9 (68.3) | 10.5 (72.4) | 10.3 (71.0) |
| ILSS | ksi (MPa) | RTA | — | 15.0 (103.4) | 13.6 (93.8) | 17.3 (119.3) | 17.1 (117.9) |
| OHC | ksi (MPa) | RTA | 49.7 (342.7) | 47.4 (326.8) | 47.4 (326.8) | 49.8 (343.4) | — |
| OHT | ksi (MPa) | −65 F. | 84.2 (580.5) | 77.5 (534.3) | 82.7 (570.2) | 82.4 (568.1) | — |
| OHT | ksi (MPa) | RTA | 80.4 (554.3) | 76.6 (528.1) | 80.9 (557.8) | 77.0 (530.9) | 79.1 (545.4) |
| 90° Flex Strength | ksi (MPa) | RTA | — | 12.2 (84.1) | 8.1 (55.9) | 14.1 (97.2) | 16.8 (115.8) |
| 90° Flex Modulus | Msi (GPa) | RTA | — | 1.24 (8.6) | 1.37 (9.5) | 1.34 (9.2) | 1.37 (9.5) |
| 90/0° Comp. Str. | ksi (MPa) | RTA | — | 121.4 (837.0) | 142 (979.1) | 140.2 (966.7) | 140.2 (966.7) |
| 0° Tension Strength | ksi (MPa) | RTA | 437 (3013) | 437 (3013) | 430 (2965) | 466 (3213) | — |

TABLE 6-continued

| Property | Unit | Cond. | T1C | T2C | T3C | T4 | T5 |
|---|---|---|---|---|---|---|---|
| 0° Tension Modulus | Msi (GPa) | RTA | 24.4 (168.2) | 23.5 (162.0) | 23.4 (161.3) | 23.4 (161.3) | — |
| CAI @ 1500 in-lb/in impact | ksi (MPa) | RTA | 41.8 (288.2) | 55.0 (379.2) | 44.5 (306.8) | — | 35.0 (241.3) |
| Damage area, 6 db | in$^2$ (cm$^2$) | RTA | 4.1 (26.5) | 1.3 (8.4) | 2.5 (16.1) | — | 4.1 (26.5) |
| Gic** | In-lb/in$^2$ (J/m$^2$) | RTA | — | — | 10 (1750) | — | 3.1 (543) |
| G1p | In-lb/in$^2$ (J/m$^2$) | RTA | — | — | 11.9 (2083) | — | 6.0 (1050) |
| OHC | ksi (MPa) | 180 F. wet | — | 37.7 (259.9) | 42.5 (293.0) | — | — |
| OHC | ksi (MPa) | 250 F. wet | — | — | 35.5 (244.8) | — | — |
| CLC Strength | ksi (MPa) | RTA | — | 92 (634.3) | 132.7 (914.9) | — | 130.6 (900.5) |
| CLC Modulus | msi (Pa) | RTA | — | 11.9 (82.1) | 10.2 (70.3) | — | 11.6 (80.0) |

**Room temperature ambient

As shown in Table 6, the low neat polymer tensile modulus of T2C generally gave consistently lower shear and compression properties.

The combination of a lower melt point with compression and shear properties that approach those of TiC makes composites T4 and T5 unique. Indeed, T4 and T5 demonstrate good balance of toughness, as shown by Gic** and CAI, and shear stiffness as shown by IPS modulus, while still exhibiting the advantages of the lower-melting-point PEKK-PEoEK copolymer.

Should the disclosure of any patents, patent applications, and publications which are incorporated herein by reference conflict with the description of the present application to the extent that it may render a term unclear, the present description shall take precedence.

The invention claimed is:

1. A composite material, comprising:
   continuous fibers, and
   a polymer matrix comprising at least one PEEK-PEoEK copolymer, the PEEK-PEoEK copolymer comprising at least 50 mol %, collectively, of repeat units (R$_{PEEK}$) and repeat units (R$_{PEoEK}$), relative to the total number of repeat units in the PEEK-PEoEK copolymer, wherein:
   (a) repeat units (RPEEK) are repeat units of formula:

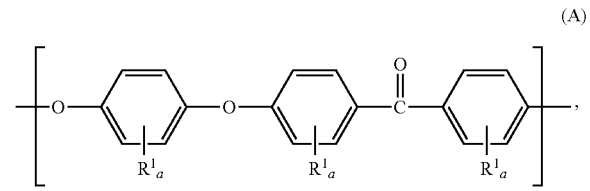

(A)

and
   (b) repeat units (RPEoEK) are repeat units of formula (B):

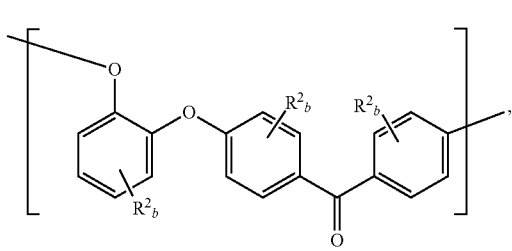

(B)

wherein:
   each R1 and R2, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium,
   each a and b is independently selected from the group consisting of integers ranging from 0 to 4, and
   the PEEK-PEoEK copolymer comprises the repeat units RPEEK and RPEoEK in a molar ratio RPEEK/RPEoEK ranging from 95/5 to 5/95,
   wherein said polymer matrix is in contact with at least part of the surface of said continuous fibers.

2. The composite material of claim 1, wherein the repeat units (RPEEK) are repeat units of formula:

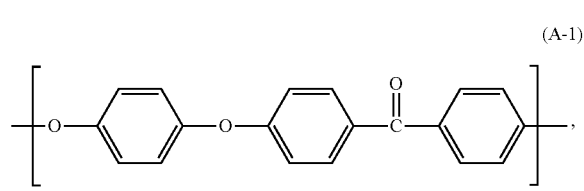

(A-1)

and/or the repeat units ($R_{PEoEK}$) are repeat units of formula:

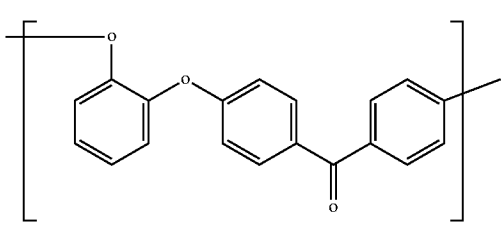

(B-1)

3. The composite material of claim 1, wherein repeat units $R_{PEEK}$ and $R_{PEoEK}$ are present in the PEEK-PEoEK copolymer in a $R_{PEEK}/R_{PEoEK}$ molar ratio ranging from 50/50 to 95/5.

4. The composite material of claim 1, wherein:
the PEEK-PEoEK copolymer has a melting temperature (Tm) of less than or equal to 340° C., wherein the melting temperature (Tm) is measured as the peak temperature of the melting endotherm on the second heat scan in a differential scanning calorimeter (DSC) according to ASTM D3418-03 and E794-06, and using heating and cooling rates of 10° C./min; and/or
the PEEK-PEoEK copolymer has as heat of fusion (ΔH) of at least 5 J/g wherein the heat of fusion is determined as the area under the melting endotherm on the second heat scan in a differential scanning calorimeter (DSC) according to ASTM D3418-03 and E793-06, with heating and cooling rates of 10° C./min.

5. The composite material of claim 1, wherein the PEEK-PEoEK copolymer possesses a microstructure such that its FT-IR spectrum, when recorded between 600 and 1,000 cm$^{-1}$ in ATR mode on polymer powder, is such that the following inequalities are satisfied:

$$\frac{A_{700\,cm^{-1}}}{A_{704\,cm^{-1}}} \leq 0.99,$$

(i) wherein $A_{700cm-1}$ is the absorbance at 700 cm$^{-1}$ and $A_{704cm-1}$ is the absorbance at 704 cm$^{-1}$;

$$\frac{A_{816\,cm^{-1}}}{A_{835\,cm^{-1}}} \geq 0.61,$$

(ii) wherein $A_{816cm-1}$ is the of absorbance at 816 cm$^{-1}$ $A_{835cm-1}$ is the absorbance at 835 cm$^{-1}$;

$$\frac{A_{623\,cm^{-1}}}{A_{557\,cm^{-1}}} \leq 1.60,$$

(iii) wherein $A_{623cm-1}$ is the of absorbance at 623 cm$^{-1}$ and $A_{557cm-1}$ is the absorbance at 557 cm$^{-1}$;

$$\frac{A_{928\,cm^{-1}}}{A_{924\,cm^{-1}}} \leq 1.09,$$

(iv) wherein $A_{928cm-1}$ is the of absorbance at 928 cm$^{-1}$ and $A_{924cm-1}$ is the absorbance at 924 cm$^{-1}$.

6. The composite material of claim 1, wherein:
the PEEK-PEoEK copolymer has a calcium content of less than 5 ppm, as measured by Inductively Coupled Plasma Optical Emission Spectrometry (ICP-OES) calibrated with standards of known calcium content; and/or
the PEEK-PEoEK copolymer has a sodium content of less than 1,000 ppm, as measured by Inductively Coupled Plasma Optical Emission Spectrometry (ICP-OES) calibrated with standards of known sodium content; and/or
the PEEK-PEoEK copolymer has a phosphorus content of at least 6 ppm, as measured by Inductively Coupled Plasma Optical Emission Spectrometry (ICP-OES) calibrated with standards of known phosphorus content.

7. The composite material of claim 1, wherein the polymer matrix further comprises at least one additive.

8. The composite material of claim 1, wherein the polymer matrix comprises at least 10 wt. % of PEEK-PEoEK copolymer, based on the total weight of the polymer matrix.

9. A method of making the material of claim 1, the method comprising contacting the polymer matrix comprising the PEEK-PEoEK copolymer with at least a part of the surface of the fibers.

10. The method of claim 9, wherein the polymer matrix is contacted with fibers in a melt impregnation process, in slurry process, in a film lamination process or in dry powder coating or fusion process.

11. A composite material, comprising a PEEK-PEoEK copolymer having a melting temperature of less than or equal to 315° C. and exhibiting at least one of:
an interlaminar shear strength of greater than 15 ksi (103 MPa), as measured in accordance with ASTM D2344;
an open hole compression strength of 47 ksi (324 MPa), as measured in accordance with ASTM D6484;
an in-plane shear modulus of greater than or equal to 0.68 Msi (4.7 GPa), as measured in accordance with ASTM D3518;
a compression after impact at 1500 in-lb/in (6672 N-m/m) of 35 ksi (241 MPa), as measured in accordance with ASTM D7137, and/or
a 90/0° compression strength of greater than or equal to 120 ksi (827 MPa), as measured in accordance with SACMA SRM-1.

12. A composite material, comprising fibers, and polymer matrix that comprises a PEEK-PEoEK copolymer having a melt temperature of less than or equal to 315° C., wherein the composite material exhibits an interlaminar shear strength of greater than or equal to 15 ksi (103 MPa).

13. A method for consolidating a plurality of adjacent layers, the method comprising:
processing a plurality of adjacent layers of the composite material of claim 1 in a vacuum bag process in an autoclave or oven by heating to a consolidation temperature of greater than 320° C. and, once consolidation temperature is reached, applying a pressure of from 0 to 20 bars for from 1 minute to 240 minutes, then allowing the plies to cool, thus forming a laminate.

14. A method for making a low void, consolidated laminate, the method comprising:
processing layers of the composite material of claim 1 with an automated lay-up machine outfitted with a heat device to simultaneously melt and fuse a layer to a previously-laid layer as the layer is being placed and oriented on the previously-laid layer to form a consolidated laminate having less than 2% volume of voids; and optionally further comprising annealing the consolidated laminate in either a free standing or vacuum bag operation, typically in temperature range of 170° C. to 270° C. for a time from 1 minute to 240 minutes.

15. A method for forming a composite part, the method comprising:
pre-orienting plies of the composite material of claim 1,
consolidating the pre-oriented plies in a heated and cooled press, double belt press or continuous compression molding machine to make a consolidated laminate;
optionally cutting the consolidated laminate to a pre-determined size to make a forming blank;
rapidly heating the forming blank to a temperature of 320 to 360 C in a stamp-forming process tool, thus making a formed composite part.

16. The composite material of claim 1, wherein the continuous fibers are either plies of impregnated fabrics or unidirectional fiber reinforced tapes.

* * * * *